United States Patent
Moffie et al.

(10) Patent No.: US 8,719,936 B2
(45) Date of Patent: May 6, 2014

(54) VMM-BASED INTRUSION DETECTION SYSTEM

(75) Inventors: Micha Moffie, Somerville, MA (US); David Kaeli, Medway, MA (US); Aviram Cohen, Lexington, MA (US); Javed Aslam, Weston, MA (US); Malak Alshawabkeh, Quincy, MA (US); Jennifer Dy, Framingham, MA (US); Fatemeh Azmandian, Taunton, MA (US)

(73) Assignee: Northeastern University, Boston, MA (US)

( * ) Notice: Subject to any disclaimer, the term of this patent is extended or adjusted under 35 U.S.C. 154(b) by 539 days.

(21) Appl. No.: 12/865,795

(22) PCT Filed: Feb. 2, 2009

(86) PCT No.: PCT/US2009/032858
§ 371 (c)(1),
(2), (4) Date: Aug. 2, 2010

(87) PCT Pub. No.: WO2009/097610
PCT Pub. Date: Aug. 6, 2009

(65) Prior Publication Data
US 2011/0004935 A1    Jan. 6, 2011

Related U.S. Application Data

(60) Provisional application No. 61/147,913, filed on Jan. 28, 2009, provisional application No. 60/063,296, filed on Feb. 1, 2008.

(51) Int. Cl.
*H04L 29/06* (2006.01)
(52) U.S. Cl.
USPC ............................................................ 726/23

(58) Field of Classification Search
USPC ........................................................... 726/23
See application file for complete search history.

(56) References Cited

U.S. PATENT DOCUMENTS

| | | | |
|---|---|---|---|
| 4,400,769 A | 8/1983 | Kaneda et al. |
| 5,774,727 A | 6/1998 | Walsh et al. |
| 5,872,978 A | 2/1999 | Hoskins |
| 6,088,804 A | 7/2000 | Hill et al. |
| 6,118,940 A | 9/2000 | Alexander, III et al. |

(Continued)

OTHER PUBLICATIONS

Laureano, M.; Maziero, C.; Jamhour, E.; , "Intrusion detection in virtual machine environments," Euromicro Conference, 2004. Proceedings. 30th , vol., no., pp. 520-525, Aug. 31-Sep. 3, 2004, doi: 10.1109/EURMIC.2004.1333416, URL: http://ieeexplore.ieee.org/stamp/stamp.jsp?tp=&arnumber=1333416&isnumber=29441.*

(Continued)

*Primary Examiner* — David García Cervetti
(74) *Attorney, Agent, or Firm* — Wilmer Cutler Pickering Hale and Dorr LLP

(57) ABSTRACT

An intrusion detection system collects architectural level events from a Virtual Machine Monitor where the collected events represent operation of a corresponding Virtual Machine. The events are consolidated into features that are compared with features from a known normal operating system. If an amount of any differences between the collected features and the normal features exceeds a threshold value, a compromised Virtual Machine may be indicated. The comparison thresholds are determined by training on normal and abnormal systems and analyzing the collected events with machine learning algorithms to arrive at a model of normal operation.

31 Claims, 5 Drawing Sheets

(56) References Cited

U.S. PATENT DOCUMENTS

| | | | |
|---|---|---|---|
| 6,253,224 B1* | 6/2001 | Brice et al. ............... | 718/1 |
| 6,405,318 B1 | 6/2002 | Rowland | |
| 6,549,208 B2 | 4/2003 | Maloney et al. | |
| 6,681,238 B1* | 1/2004 | Brice et al. ............... | 718/1 |
| 6,775,657 B1 | 8/2004 | Baker | |
| 6,789,202 B1 | 9/2004 | Ko et al. | |
| 7,028,338 B1 | 4/2006 | Norris et al. | |
| 7,035,387 B2 | 4/2006 | Russell et al. | |
| 7,073,074 B2 | 7/2006 | Pandit et al. | |
| 7,093,239 B1 | 8/2006 | van der Made | |
| 7,134,141 B2 | 11/2006 | Crosbie et al. | |
| 7,146,305 B2 | 12/2006 | van der Made | |
| 7,222,062 B2* | 5/2007 | Goud et al. ............... | 703/23 |
| 7,257,719 B2 | 8/2007 | Pandit et al. | |
| 7,260,846 B2 | 8/2007 | Day | |
| 7,409,719 B2* | 8/2008 | Armstrong et al. ....... | 726/24 |
| 7,424,709 B2* | 9/2008 | Neiger et al. ............. | 718/1 |
| 7,454,548 B2* | 11/2008 | Belmar et al. ............ | 710/260 |
| 7,496,961 B2* | 2/2009 | Zimmer et al. ........... | 726/23 |
| 7,539,986 B2* | 5/2009 | Grobman ................... | 718/1 |
| 7,565,522 B2* | 7/2009 | Sastry et al. .............. | 713/2 |
| 7,620,949 B2* | 11/2009 | Bennett et al. ............ | 718/1 |
| 7,797,748 B2* | 9/2010 | Zheng et al. .............. | 726/24 |
| 7,844,954 B2* | 11/2010 | Venkitachalam et al. ... | 717/130 |
| 7,886,190 B2* | 2/2011 | Rothman et al. .......... | 714/36 |
| 7,962,738 B2* | 6/2011 | Zimmer et al. ........... | 713/2 |
| 8,127,292 B1* | 2/2012 | Dobrovolskiy et al. ... | 718/1 |
| 8,276,201 B2* | 9/2012 | Schunter et al. .......... | 726/22 |
| 8,327,438 B2* | 12/2012 | Hwang et al. ............. | 726/22 |
| 8,336,099 B2* | 12/2012 | Dow et al. ................ | 726/23 |
| 8,510,756 B1* | 8/2013 | Koryakin et al. ......... | 719/318 |
| 2004/0117539 A1* | 6/2004 | Bennett et al. ............ | 711/6 |
| 2005/0086523 A1* | 4/2005 | Zimmer et al. ........... | 713/201 |
| 2005/0289542 A1* | 12/2005 | Uhlig et al. ............... | 718/1 |
| 2006/0041761 A1* | 2/2006 | Neumann et al. ......... | 713/189 |
| 2006/0070066 A1* | 3/2006 | Grobman ................... | 718/1 |
| 2006/0130060 A1* | 6/2006 | Anderson et al. ......... | 718/1 |
| 2006/0136720 A1* | 6/2006 | Armstrong et al. ....... | 713/164 |
| 2006/0161982 A1* | 7/2006 | Chari et al. ............... | 726/23 |
| 2006/0236127 A1* | 10/2006 | Kurien et al. ............. | 713/193 |
| 2007/0226736 A1* | 9/2007 | Johnson et al. ........... | 718/1 |
| 2007/0250930 A1 | 10/2007 | Aziz et al. | |
| 2007/0266149 A1 | 11/2007 | Cobb et al. | |
| 2007/0271610 A1* | 11/2007 | Grobman ................... | 726/22 |
| 2008/0059726 A1* | 3/2008 | Rozas et al. .............. | 711/154 |
| 2008/0163207 A1* | 7/2008 | Reumann et al. ......... | 718/1 |
| 2008/0216175 A1* | 9/2008 | Pike ........................... | 726/22 |
| 2008/0222309 A1* | 9/2008 | Shanbhogue .............. | 709/250 |
| 2008/0222729 A1* | 9/2008 | Chen et al. ................ | 726/24 |
| 2008/0235534 A1* | 9/2008 | Schunter et al. .......... | 714/8 |
| 2008/0235793 A1* | 9/2008 | Schunter et al. .......... | 726/22 |
| 2008/0244114 A1* | 10/2008 | Schluessler et al. ...... | 710/24 |
| 2008/0289040 A1* | 11/2008 | Ithal .......................... | 726/23 |
| 2008/0320594 A1* | 12/2008 | Jiang .......................... | 726/22 |
| 2009/0031421 A1* | 1/2009 | Lee et al. .................. | 726/23 |
| 2009/0044265 A1* | 2/2009 | Ghosh et al. .............. | 726/14 |
| 2009/0044274 A1* | 2/2009 | Budko et al. .............. | 726/24 |
| 2009/0055571 A1* | 2/2009 | Budko et al. .............. | 711/6 |
| 2009/0055693 A1* | 2/2009 | Budko et al. .............. | 714/57 |
| 2009/0094175 A1* | 4/2009 | Provos et al. ............. | 706/12 |
| 2009/0164770 A1* | 6/2009 | Zimmer et al. ........... | 713/2 |
| 2009/0165133 A1* | 6/2009 | Hwang et al. ............. | 726/22 |
| 2009/0172822 A1* | 7/2009 | Sahita et al. .............. | 726/27 |
| 2009/0254990 A1* | 10/2009 | McGee ..................... | 726/22 |
| 2009/0320011 A1* | 12/2009 | Chow et al. ............... | 717/154 |
| 2010/0333089 A1* | 12/2010 | Talwar et al. ............. | 718/1 |

OTHER PUBLICATIONS

Baiardi, F.; Sgandurra, D.; , "Building Trustworthy Intrusion Detection through VM Introspection," Information Assurance and Security, 2007. IAS 2007. Third International Symposium on , vol., no., pp. 209-214, Aug. 29-31, 2007 doi: 10.1109/IAS.2007.36, URL: http://ieeexplore.ieee.org/stamp/stamp.jsp?tp= &arnumber=4299776&isnumber=4299732.*

T. Garfinkel and M. Rosenblum. A virtual machine introspection based architecture for intrusion detection. In in Proc. Network and Distributed Systems Security Symposium, pp. 191-206, 2003.*

Alshawabkeh, Effective Virtual Machine Monitor Intrusion Detection Using Feature Selection on Highly Imbalanced Data, 2010, 9th Intl Conference on Machine Learning and Applications.*

Lionel Litty, Hypervisor-based Intrusion Detection, 2005, Univeristy of Toronto.*

Zhao et al., Virtual Machine Security Systems, 2012.*

Azmandian et al, Virtual Machine Monitor-Based Lightweight Intrusion Detection, 2011, ACM, Northeastern University.*

Y. Beres and C. I. Dalton, "Dynamic Label Binding at Run-time," *NSPW '03: Proceedings of the 2003 workshop on New security paradigms*, pp. 39-46, New York, NY, USA, 2003.

W. Cheng, Q. Zhao, B. Yu, and S. Hiroshige, "TaintTrace: Efficient Flow Tracing with Dynamic Binary Rewriting," *Proc. 11th IEEE International Symposium on Computers and Communications*. IEEE, Jun. 2006.

D. E. Denning, "A Lattice Model of Secure Information Flow," *Communications of the ACM*, vol. 19, No. _5, pp. 236-243, May 1976.

G. Edjlali, A. Acharya, and V. Chaudhary, "History-Based Access Control for Mobile Code," *CCS '98: Proceedings of the 5th ACM Conference on Computer and Communications Security*, pp. 38-48, 1998.

Y. Freund and R. E. Schapire, "Experiments with a New Boosting Algorithm," 1996.

D. Gao, M. K. Reiter, and D. Song, "On Gray-Box Program Tracking for Anomaly Detection," *Proceedings of the 13th USENIX Security Symposium*, pp. 103-118, San Diego, CA, USA, Aug. 9-13, 2004.

T. Garfinkel and M. Rosenblum, "A Virtual Machine Introspection Based Architecture for Intrusion Detection," *Proc. Network and Distributed Systems Security Symposium*, Feb. 2003.

I. Goldberg, D. Wagner, R. Thomas, and E. A. Brewer, "A Secure Environment for Untrusted Helper Applications (Confining the Wily Hacker)," *Proceedings of the 6th Usenix Security Symposium*, San Jose, CA, USA, 1996.

J. L. Griffin, A. G. Pennington, J. S. Bucy, D. Choundappan, N. Muralidharan, and G. R. Ganger, "On the Feasibility of Intrusion Detection Inside Workstation Disks," Technical Report CMU-PDL-03-106, Carnegie Mellon Unversity, 2003.

S. A. Hofmeyr, S. Forrest, and A. Somayaji, "Intrusion Detection Using Sequences of System Calls," *Journal of Computer Security*, 6(3):151-180, 1998.

X. Jiang, X. Wang, and D. Xu, "Stealthy Malware Detection Through VMM-Based "Out-of-the-Box" Semantic View Reconstruction," *CCS '07: Proceedings of the 14th ACM conference on Computer and Communications Security*, pp. 128-138, New York, NY, USA, 2007.

S. T. Jones, A. C. Arpaci-Dusseau, and R. H. Arpaci-Dusseau, "Antfarm: Tracking Processes in a Virtual Machine Environment," *ATEC '06: Proceedings of the Annual Conference on USENIX '06 Annual Technical Conference*, Berkeley, CA, USA, 2006. USENIX Association.

S. T. Jones, A. C. Arpaci-Dusseau, and R. H. Arpaci-Dusseau, "VMM-Based Hidden Process Detection and Identification Using Lycosid," *VEE '08: Proceedings of the Fourth ACM SICPLAN/ SIGOPS International Conference on Virtual Execution Environments*, pp. 91-100, New York, NY, USA, 2008. ACM.

E. Kirda, C. Kruegel, G. Banks, G. Vigna, and R. Kemmerer, "Behavior-Based Spyware Detection," *Proceedings of the 15th USENIX Security Symposium*, Vancouver, BC, Canada, Aug. 2006.

C. Ko, T. Fraser, L. Badger, and D. Kilpatrick, "Detecting and Countering System Intrusions Using Software Wrappers," *Proceedings of the USENIX Security Conference*, pp. 145-156. Aug. 2000.

A. P. Kosoresow and S. A. Hofmeyr, "Intrusion Detection Via System Call Traces," IEEE Softw., 14(5):35-42, 1997.

M. Laureano, C. Maziero, and E. Jamhour, "Intrusion Detection in Virtual Machine Environments," *Proceedings of the 30th EUROMICRO Conference (EUROMICRO '04)*, pp. 520-525, Washington, DC, USA, 2004.

V. Makhija, B. Herndon, P. Smith, L. Roderick, E. Zamost, and J. Anderson, "VMmark: A Scalable Benchmark for Virtualized Systems," Technical Report TR-2006-002, VMware Inc., Sep. 2006.

(56) References Cited

OTHER PUBLICATIONS

A. C. Myers, "JFlow: Practical Mostly-Static Information Flow Control," *POPL '99: Proceedings of the 26th ACM SIGPLAN-SIGACT Symposium on Principles of Programming Languages*, pp. 228-241, New York, NY, USA, 1999. ACM Press.

J. Newsome and D. Song, "Dynamic Taint Analysis for Automatic Detection, Analysis, and Signature Generation of Exploits on Commodity Software," *The 12th Annual Network and Distributed System Security Symposium*, Feb. 3-4, San Diego, CA, USA, 2005.

P. Barham, B. Dragovic, K. Fraser, S. Hand, T. Harris, A. Ho, R. Neugebauer, I. Pratt, and A. Warfield, "Xen and the Art of Virtualization," SOSP '03: Proceedings of the Nineteenth ACM Symposium on Operating Systems Principles, pp. 164-177, 2003.

R. E. Schapire, "The Boosting Approach to Machine learning. An Overview," *Nonlinear Estimation and Classification*. Springer, 2001.

H. Schulzrinne, S. Narayanan, J. Lennox, and M. Doyle, "SIPstone—Benchmarking SIP Server Performance," http://www.sipstone.org/, Apr. 2002.

K. Scott and J. Davidson, "Safe Virtual Execution Using Software Dynamic Translation," ACSAC '02: Proceedings of the 18th Annual Computer Security Applications Conference, p. 209, Washington, D.C., USA, 2002. IEEE Computer Society.

J. Seward and N. Nethercote, "Using Valgrind to Detect Undefined Value Errors with Bit-Precision," USENIX 2005 Annual Technical Conference, pp. 17-30, Anaheim, CA, USA, 2005.

S. J. Stolfo, F. Apap, E. Eskin, K. Heller, S. Hershkop, A. Honig, and K. Svore, "A Comparative Evaluation of Two Algorithms for Windows Registry Anomaly Detection," J. Comput. Securit., 13(4):659-693, 2005.

N. Vachharajani, M. J. Bridges, J. Chang, R. Rangan, G. Ottoni, J. A. Blome, G. A. Reis, M. Vachharajani, and D. I. August, "RIFLE: An Architectural Framework for User-Centric Information-Flow Security," *MICRO 37: Proceedings of the 37th Annual International Symposium on Microarchitecture*, pp. 243-254, Washington, DC, USA, 2001. IEEE Computer Society.

D. Wagner and D. Dean, "Intrusion Detection Via Static Analysis," SP '01: Proceedings of the 2001 IEEE Symposium on Security and Privacy, p. 156, Washington, DC, USA, 2001. IEEE Computer Society.

C. Warrender, S. Forrest, and B. Pearlmutter, "Detecting Intrusions Using Systems Calls: Alternative Data Models," IEEE Symposium on Security and Privacy, pp. 133-145, 1999.

Y. Freund and R. E. Schapire, "A Decision-Theoretic Generalization of On-Line Learning and an Application to Boosting," *Journal of Computer and System Sciences*, 55(1):119-139, Aug. 1997.

* cited by examiner

Un-Hosted

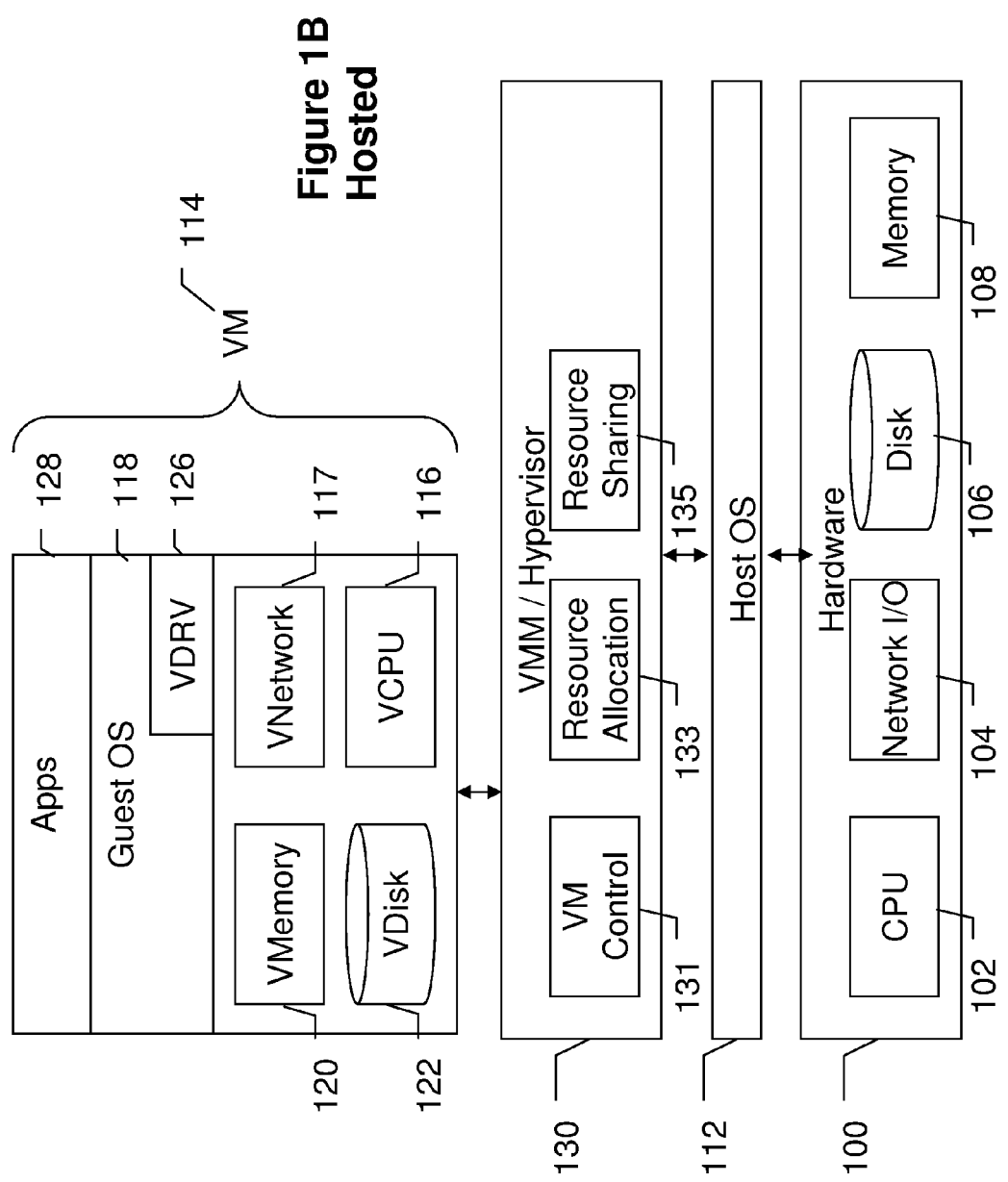

VMM-BASED INTRUSION DETECTION SYSTEM

RELATED APPLICATION

This application is a non-provisional application of provisional application Ser. No. 61/147,913 filed Jan. 28, 2009 and entitled "VMM-Based HIDS," and provisional application Ser. No. 61/063,296 filed Feb. 1, 2008 and entitled "Intrusion Detection System Using Virtualization-Based Profiling And Pattern Classification Algorithms," the entire contents of each of which are hereby incorporated by reference for all purposes.

FIELD OF THE INVENTION

This invention relates generally to providing intrusion detection by monitoring events in a virtualized environment.

BACKGROUND OF THE INVENTION

Zero day attacks and hidden malware are threats to computer users. Malicious software can degrade the performance of computing systems, leak sensitive information, and disable entire computing infrastructures. Information security is a major concern for any computer-based commercial or government entity that deals with online information. A 2007 report by the US Government Office of Accountability documents that cybercrime (computer crime, identity theft and phishing) cost the U.S. economy $117.5B in 2006.

All industries are susceptible to cybercrime. Some of the most susceptible markets are: financial institutions, online retailers, credit card companies, and data repositories. Most commercial IT organizations employ a first-line of defense such as anti-virus and firewall software. To date, however, these widespread security measures have proven to be ineffective in guarding against these types of intrusions because these solutions can only thwart known attacks, i.e., ones that have been seen before or ones that may have already done harm. Anti-virus and firewall software also require continual updates of their signature databases and configuration information, and they provide no defense against zero-day attacks (i.e., new classes of attacks).

An alternative approach is to utilize an Intrusion Detection System (IDS), and specifically a Host-based Intrusion Detection Systems (HIDS). These systems look for anomalous behavior on a computing system, tracking activity at either the application level or the operating system level to look for abnormal behavior. Problems with these approaches include: a) the inability of the IDS to capture both application and operating system behavior (which limits completeness); b) the significant amount of overhead introduced into the runtime system (which impacts performance); and c) the inability of the IDS to avoid being compromised by malicious software (which impacts security).

Security mechanisms that are able to differentiate regular (normal) behavior from malicious (abnormal) behavior may promise new ways to detect, counter and ultimately prevent the execution of zero day attacks and hidden malware. To date, however, these IDSs have not been able to do so in a manner that is not resource intensive or without impairing normal operation.

New security measures are essential to secure computer systems, protect digital information and restore user confidence.

SUMMARY OF THE INVENTION

An intrusion detection system collects architectural level events from a Virtual Machine Monitor where the collected events represent operation of a corresponding Virtual Machine. The events are consolidated into features that are compared with features from known normal system operation. If an amount of any differences between the collected features and the normal features exceeds a threshold value, a compromised Virtual Machine may be indicated. The comparison thresholds are determined by training on normal and/or abnormal systems, and analyzing the collected events with machine learning algorithms to arrive at a model of normal operation.

BRIEF DESCRIPTION OF THE DRAWINGS

Various aspects of at least one embodiment of the present invention are discussed below with reference to the accompanying figures. In the figures, which are not intended to be drawn to scale, each identical or nearly identical component that is illustrated in the various figures is represented by a like numeral. For purposes of clarity, not every component may be labeled in every drawing. The figures are provided for the purposes of illustration and explanation and are not intended as a definition of the limits of the invention. In the figures:

FIGS. 1A and 1B are block diagrams of virtualized systems in which embodiments of the present invention may be implemented;

DETAILED DESCRIPTION

Figure 1A:
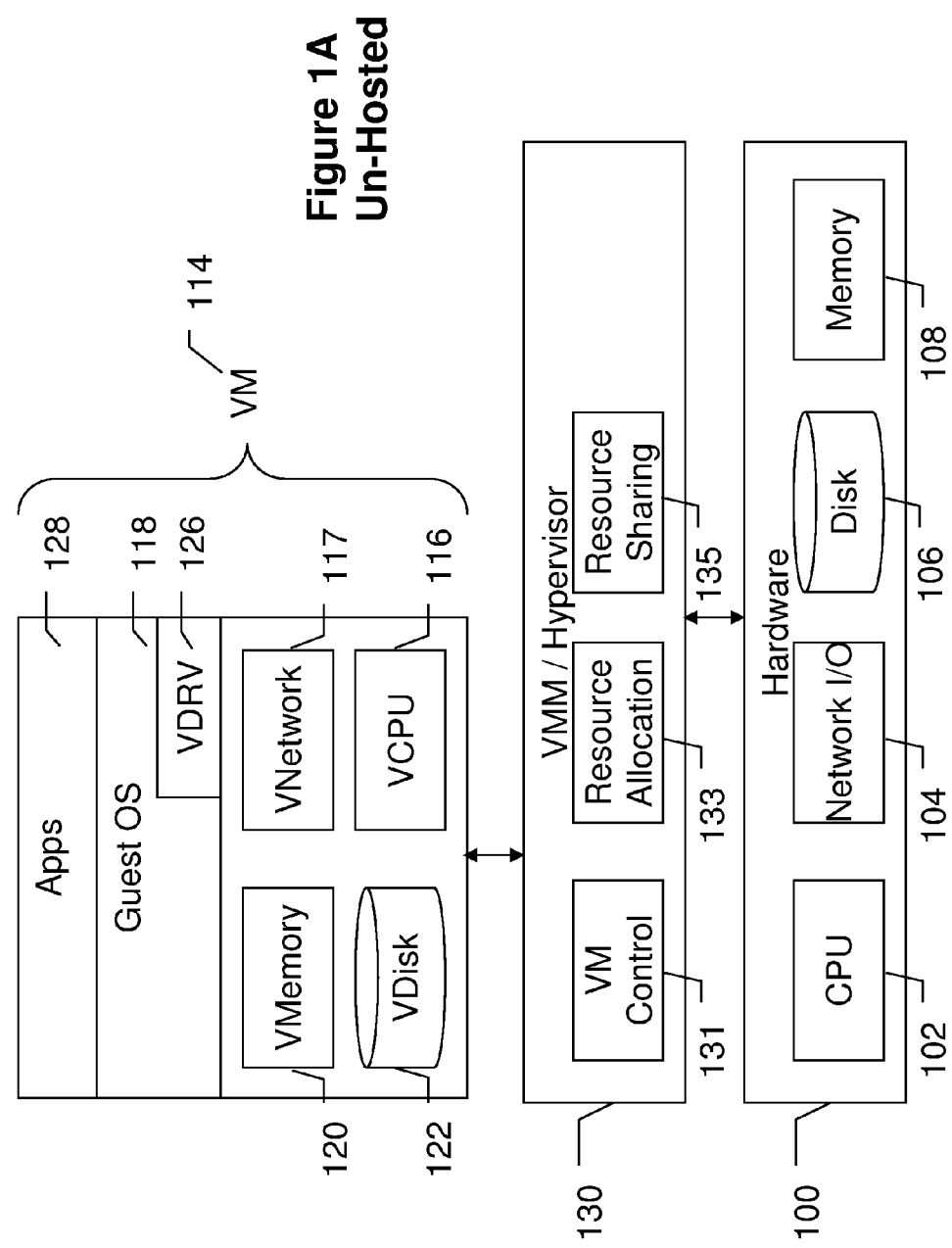

Current state-of-the-art security systems use anti-virus software and firewall programs to safeguard a system. These solutions introduce significant overhead into the application environment. Further, anti-virus software depends upon having a repository of known exploits, i.e., a signature database, that can be used to scan binaries. Anti-virus software is heavily dependent on keeping the repository up to date and cannot identify or disable viruses that are just being deployed (known as zero-day attacks).

Embodiments of the present invention do not rely on known bad behavior, but instead are based on profiles of known good behavior. The approaches described herein are proactive by design and remain adaptive, identifying and defending against new exploits and attacks as they are deployed.

Advantageously, embodiments of the present invention provide a VMM-based Intrusion Detection System (VIDS) that utilizes the virtual machine monitor (VMM) layer in a virtualized system to extract VMM-level semantics or information during runtime. By extracting VMM-level information that, in one embodiment, is optimized to a particular VMM and architecture, the IDS is easier to deploy and manage as a part of a VMM.

As will be understood from the description below, one or more embodiments of the present invention do not depend on a particular operating system running in a corresponding virtual machine (VM). Different versions of operating systems, e.g., Windows and Linux, are supported without the need for any modifications.

Further, as part of a virtualization platform, security for multiple systems can be managed and controlled from a single centralized point. This reduces the cost and overhead associated with deploying VIDS across an organization.

While it may appear that a VMM-based IDS introduces a semantic gap between the program-level behavior of malware and the information that is extracted from the VMM, embodiments of the present invention address this concern by employing advanced data mining techniques. As will be described below, VMM-level events are extracted and features are developed that, when combined with sophisticated machine learning algorithms, accurately identify security intrusions in compute-server appliances.

The entire contents of United States provisional patent application Ser. No. 61/147,913 filed Jan. 28, 2009 and entitled "VMM-Based HIDS," and provisional patent application Ser. No. 61/063,296 filed Feb. 1, 2008 and entitled "Intrusion Detection System Using Virtualization-Based Profiling And Pattern Classification Algorithms," are hereby incorporated by reference for all purposes and wherein a copy of the former application is provided herewith in an appendix.

It is to be appreciated that embodiments of the methods and apparatuses discussed herein are not limited in application to the details of construction and the arrangement of components or steps set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Particular acts, elements and features discussed in connection with any one of the embodiments are not intended to be excluded from a similar role in any other embodiments. Also, the phraseology and terminology used herein are for the purpose of description and should not be regarded as limiting. The use herein of "including," "comprising," "having," "containing," "involving," and variations thereof, is meant to encompass the items listed thereafter and equivalents thereof as well as additional items.

As will become clear from the description below, embodiments of the present invention do not require any particular hardware platform. Nonetheless, because it is so common, and by way of example only, it is assumed below that an x86 architecture, e.g., as used in the Intel IA32 line of microprocessors, is being used.

Prior to a description of one or more embodiments of the present invention, a brief overview of virtualization technology will be presented. It should be noted that this is not intended to be a full explanation of virtualization and the concepts therein. One of ordinary skill in the art will understand that there are further details not shown as they are not necessary to understand embodiments of the present invention.

Referring now to FIGS. 1A and 1B, representations of the two most common types of virtualization systems are presented. Both virtualized systems will be described in order to subsequently describe embodiments of the present invention.

FIG. 1A presents an un-hosted virtualization system. In this model a hypervisor or virtual machine monitor (VMM) 130 is installed directly on system hardware 100. The VMM 130, as known, includes a VM control module or function 131, a resource allocation module or function 133 and a resource sharing module or function 135.

The system hardware 100 includes a central processor (CPU) 102, which may be a single processor, or multiple cooperating processors in a known multiprocessor arrangement. As in other known systems, the hardware includes, or is connected to, memory 107, disk 106 and network I/O 104.

Virtual machines (VMs) 114 are instantiated on top of the VMM 130, and provide a software abstraction to the guest operating system 118 and hosted applications 128. The virtual machine provides virtualized system elements including virtual CPUs (VCPUs) 116, virtual memory 120, virtual disks 122 and virtual drivers 126 as needed for controlling and communicating with various devices and the system hardware 100. Embodiments of the present invention do not presuppose any particular host operating system, and because the characteristics and functions of operating systems are so well known, the Guest Operating System (Guest OS) 118 need not be discussed in greater detail.

At least one virtual machine (VM) 114, is installed to run as a Guest on the host system hardware and software. As is well known in the art, a VM 114 is a software abstraction—a "virtualization"—of an actual physical computer system. As such, each VM 114 will typically include one or more virtual CPUs 116 (VCPU), Guest OSs 118 (which may, or may not, be a copy of a conventional, commodity OS), a virtual system memory (VMEM) 120, a virtual disk (VDISK) 122, and drivers (VDRV) 126, all of which are implemented in software to emulate components of an actual or physical computer. Although the key components of only one VM 114 are illustrated in FIG. 1A, the structure of any other VMs may be essentially identical.

FIG. 1B is a representation in block diagram form of the structure of a hosted VMM 130. As known to one of ordinary skill in the art, the hosted VMM is installed on top of a Host Operating System (HOS) 112, which is then installed on the physical hardware 100. The structure of the VM 114 on a hosted VMM 114 remains essentially the same as for the unhosted VMM. The HOS 112 carries out many of the services associated with managing the physical hardware resources 100, whereas in an unhosted VMM 130 the VMM is responsible for this management.

Most computers are intended to run various applications, and VMs are no exception. Consequently, by way of example, as shown in FIG. 1A, a group of applications 128 (which may be a single application) is installed to run at user level on the Guest OS 118; any number of applications, including none at all, may be loaded for running on the Guest OS 118, limited only by the capacity or requirements of the VM. In some virtualization systems, an application (or a user of the application) will not "know" that it is not running directly on "real" hardware. As known to one of ordinary skill in the art, the applications and the components of the virtual machine 114 are instructions and data stored in memory, just as any other software. The concept, design and operation of virtual machines are well known in the field of computer architecture.

The VMM 130 operates as an interface between a VM 114 and the hardware 100 in the case of an unhosted VMM and between an HOS 112 and the hardware 100 in a hosted VMM. As functionality of the virtualization software may alternatively be implemented in hardware or firmware, a more general term for this functionality is "virtualization logic." For the hosted model, a HOS 112 is real in the sense of being either the native OS of the underlying physical computer, or the OS (or other system-level software) that handles actual I/O operations, takes faults and interrupts, etc. In a hosted VMM, the hardware 100 and the OS 112, together, are responsible for executing VM-issued instructions and transferring data to and from the actual, physical memory 108 and the storage devices 106.

In either model, the virtualization software generally takes the form of a virtual machine monitor (VMM) 130, which is usually a "thin" piece of software that runs directly on top of either a HOS 112 in the hosted VMM model or directly on the hardware in the unhosted model and virtualizing all, or at least some subset of, the resources of the machine.

The interface exported by a VMM 130 to a respective VM 114 can be the same as the hardware interface of the machine, or at least of some predefined hardware platform, so that the Guest OS 118 cannot determine the presence of the VMM. The VMM 130, in the unhosted model, schedules and handles all requests by its VM for machine resources and handles various faults and interrupts. In the hosted model, the VMM 130 handles some requests directly and may track and forward others to the HOS 112, as well as handle various faults and interrupts. The general features of VMMs are known in the art and therefore need not be discussed in further detail here.

One advantage of virtualization is that each VM can be isolated from all others, and from all software other than the VMM, which itself will be transparent to the VM; indeed, as above, the user of a VM will be completely unaware that it is not running directly on the hardware, but on a virtualized set of hardware resources.

One embodiment of the present invention is securing those systems known as "software appliances," and applications servers in general servers. The basic architecture of this class of system is a commodity hardware platform (typically an X86-based system) with an MS/Windows or Linux/Unix operating system installed, and with a select set of applications present. Given the somewhat static nature of an appliance-based or application server environment, one can track and inspect execution on these systems, as the expected execution is based on a set number of installed applications. Typically, users will not login to these systems, and so the only execution should be applications initially installed on the system. Of course, one of ordinary skill in the art will understand that embodiments of the present invention are applicable to other systems, specifically those where applications can be installed over time, and not limited only to a software appliance or application server.

As above, embodiments of the present invention address the need to protect data, applications and an operating system from malicious code attacks and insider threats. Advantageously, embodiments of the present invention obtain information about both application and operating system behavior without introducing significant runtime overhead into the execution environment.

This advantage is provided at least by: a) the use of a virtualization layer to provide access to the execution stream below the Guest operating system, producing feature-rich execution profiles, and b) the use of machine learning and pattern classification algorithms to identify abnormal behavior, given such profiles.

Obtaining information in the virtualization layer has many advantages as compared to working at either an application layer or at the operating system layer. These advantages include, but are not limited to: i) the virtualization layer is essentially invisible to a potential attacker as it is located below the Guest operating system and isolates the profiling system from an attacker, ii) the described approach has a relatively small execution footprint and so introduces very little performance overhead, iii) the approach is transparent to the guest operating system (in that the OS has any knowledge of it), iv) the approach is portable and does not depend upon any particular OS, guest or otherwise, and v) the approach is relatively straightforward to deploy and manage.

Definitions

The following terms are used throughout this description:

Events—Raw run-time information collected directly at the virtualization layer. Events form an event stream when collected over time. An event is considered to be at the architectural level of the VMM, e.g., machine state such as register values, hardware—software interface information, etc.

Features—Processed event streams, capturing information on system behavior suitable for off-line profiling and/or on-line monitoring. Features include, but are not limited to, event frequency, event correlation, and other information extracted from the event stream.

Profile—An aggregation of features, representing a "snapshot" of system behavior either at a specific point in time or over a period of time. Profiles can be used off-line (pre-deployment) to construct a model of normal system behavior, and can be used on-line (post-deployment) to detect anomalous behavior, in conjunction with a model of normal behavior.

Profiling—The act of collecting a system profile, either off-line (pre-deployment) or on-line (post-deployment).

Off-line modeling—The act of constructing a model of normal system behavior. Off-line modeling occurs pre-deployment and includes the collection of events, the production of features, the generation of a system profile, and the use of machine learning techniques to generate a model of system behavior.

Execution Model—A characterization of normal system behavior, generated during the off-line modeling stage.

On-line monitoring—The act of monitoring a running system in order to detect anomalous behavior. On-line monitoring typically occurs post-deployment and may include one or more of: the collection of events, the production of features, the generation of a system profile, and the use of a model of normal system behavior, together with machine learning techniques, to identify anomalous system behavior.

Detection—The act of identifying anomalous behavior while monitoring a running system, in either post-deployment or in off-line modeling (also referred to as training).

True positive—A correct detection of anomalous behavior during monitoring.

False positive—A misidentification of normal behavior as being anomalous during monitoring.

False negative—A misidentification of anomalous behavior as being normal during monitoring.

Remediation—The steps taken following detection during monitoring. Remediation includes, but is not limited to, conveying information back to the virtualization layer detailing the cause and nature of the detection.

Figure 2:
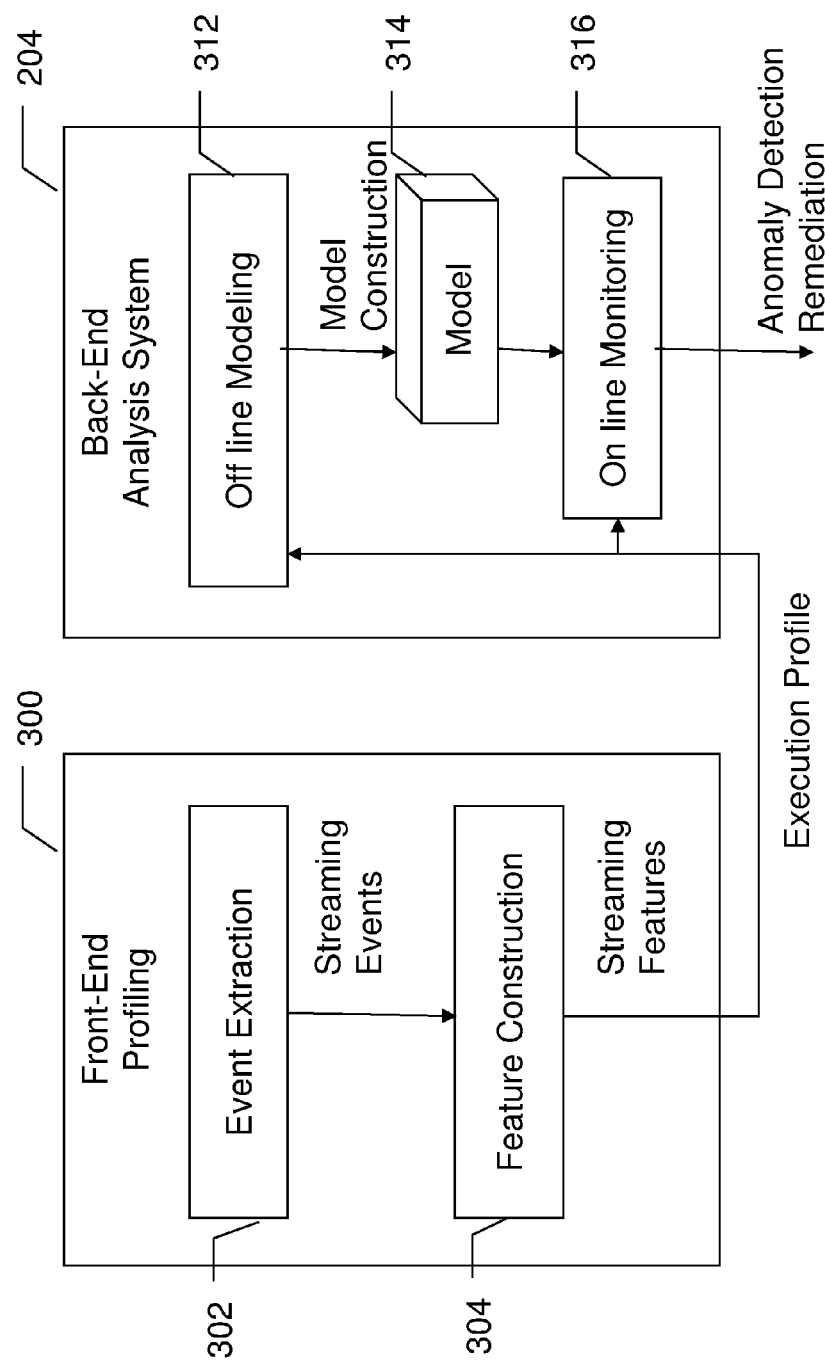
FIG. 2 is a high-level block diagram of an embodiment of the present invention.

As an overview of the system, referring to FIG. 2, via the VMM monitoring, in the front-end 300 event extraction 302 provides streaming events from which features are constructed 304. The streaming features are used as an execution profile provided to the back-end system 204 where off-line modeling 312 is implemented, resulting in a model 314. In addition, on-line modeling 316 uses a received execution profile and the model 314 to provide anomaly detection and subsequent remediation.

Figure 3:
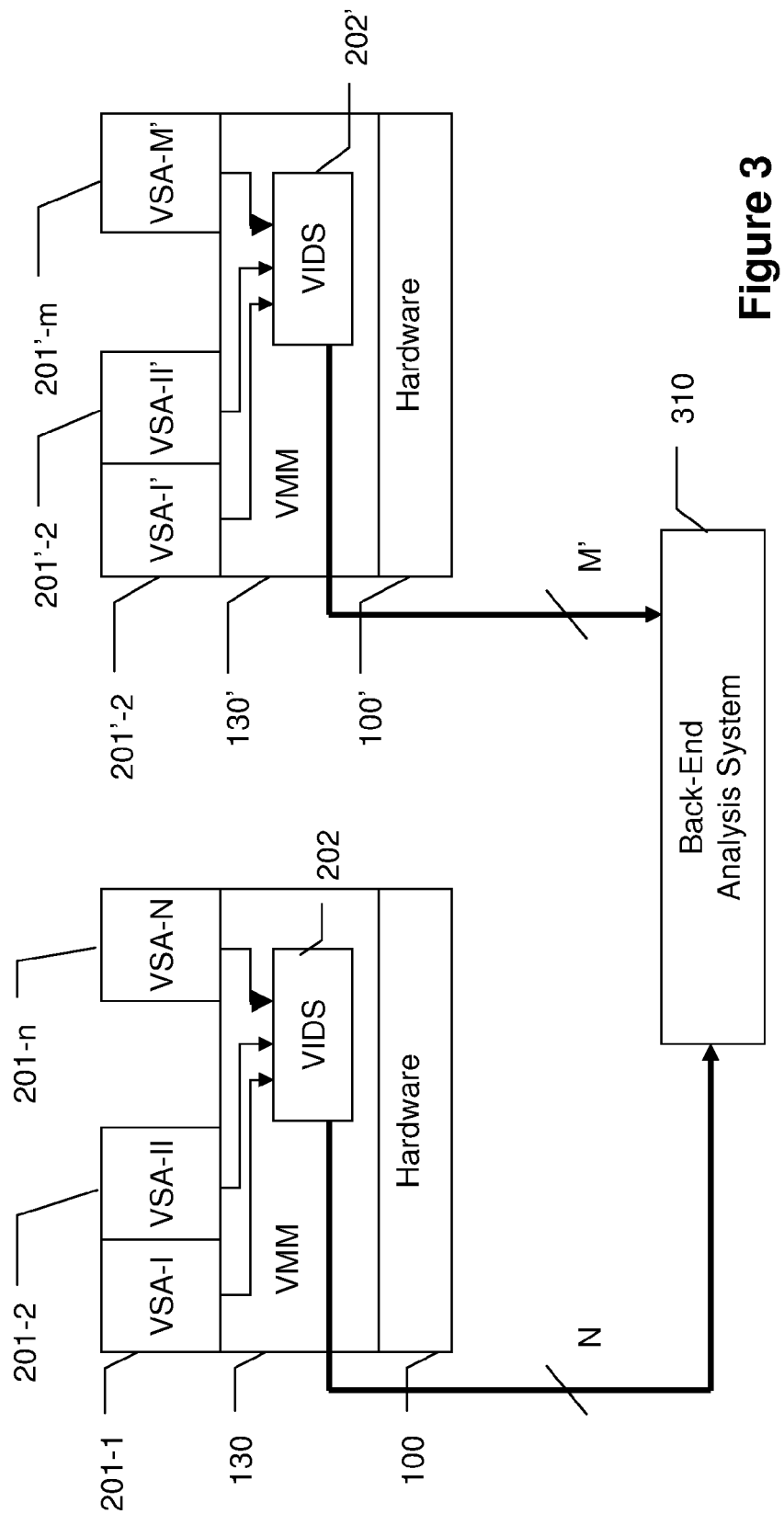
FIG. 3 is a functional block diagram of a system in accordance with an embodiment of the present invention.

In one embodiment of the present invention, as shown in FIG. 3, a virtualized software appliance (VSA) 201 sits above a virtualization layer 130 that provides access to the hardware 100. A virtual intrusion detection system (VIDS) module 202 is provided within the virtualization layer 130 and communicates with an analysis system 204. The function of the VIDS module 202 will be described in more detail below. Further, the virtualization layer 130 may be in communication with a network, e.g., the Internet, not shown, and have access to other systems. It should be noted that the VIDS module 202 is a software construct running in the virtualization layer 130 and while it is referred to as a "module" it is only meant to be a term for explanatory purposes and does not necessarily indicate a limitation as to any stand-alone structure or configuration. The VIDS 202 has access, via an API at the VMM level, for example, to VMM architectural level, i.e., machine state, information. In commercial products, VMware's ESX Server provides the VMsafe APIs and Xen provides Xentrace, both of which provide the event information discussed in this invention.

As part of the VMM, or as a module inside it, the VIDS 202 has access to the following types of raw run time information which are used to generate events:

1. VM architectural state information such as the VCPU 116 architectural state (for example its registers) and virtual devices 124 architectural state such as the virtual disk 122 and memory 120.

2. Virtualization layer state, i.e., the VMM state, including, for example, the number of VMs running, state of each VM, etc. Another class of information available in the VMM includes the execution state of the VM. In some VMMs, this execution state indicates whether the code running in the VM is executed directly on the hardware or if it is being emulated.

3. System state that can include time of day timers, CPU usage, and other runtime metrics.

The VIDS 202 tracks the execution of the VM and can monitor events corresponding to changes to the architectural, virtualization layer and system software state. These changes include for example: a write to a virtual register, or an access (read to, write from, control of) virtual device (VM architectural state changes), operations such as VM create or destroy (in the context of software virtualization layer) and system software state changes such as the current time.

The majority of these events can be tracked by most Virtual Machine Monitors as they are necessary to maintain correctness and isolation. Tracking events is also supported by new hardware extensions (aimed to support virtualization at the hardware level) to the X86 architecture such as Intel VT-x and AMD AMD-V.

Instead of, or in addition to, tracking events occurring in the VMM, a VIDS 202 can modify the VMM code to provide additional information available in the VMM, but not available to a current API. The VMM is modified at the point of installation of the IDS, and remains in place during all execution of the VMM. Modification to the VMM can be performed in source code (if source for the VMM is available) or through binary modification of the VMM. Since the VMM virtualizes a CPU(s), as well as devices, it is possible to extract event information directly from the software code emulating the behavior of the CPU or devices through the API in the VMM or through the modified VMM. Similarly, information related to the state of the virtualization can also be extracted as the software itself is implementing the functionality. Whenever an event is recorded, the VMM state information can accompany the event record.

By operation of the VIDS module 202, the virtualization layer 134 is configured to track events associated with program and operating system execution as implemented or controlled by the VMM 130. The configuration of the VMM can be done at installation time utilizing a fixed set of events, the events can be specified by the person installing the IDS by specifying the class of server workload that will be running on the virtualized system, or can be set dynamically by the off-line monitoring system to better match the characteristics of the applications running on a VM These events can include, but are not limited to: disk reads and writes, network requests, privilege level changes by the operating system, page table misses, and a variety of other events available within the virtualization layer 130. Advantageously, all execution, i.e., events, may be captured (versus only application execution events or a subset of the operating system execution events). This helps to assure that an intruder cannot identify a potential hole in the present system because all execution may be analyzed and/or captured.

Referring to FIG. 3, the monitoring or analysis system 204 is shown as a standalone or separate system used to analyze an execution profile, as represented by the collected events and/or features, generated at the virtualization layer 130. In one embodiment of the present invention, the monitoring or analysis system 204 is decoupled from the profiling system, i.e., the hardware 100, thus reducing the overhead associated with analysis of the profile. While FIG. 3 represents the system 204 as being physically separate, this is just one possible implementation of the current invention. In an alternate embodiment, the monitoring system 204 could be implemented as another virtual machine hosted on the same virtualized platform, or on a different platform, as would be understood by one of ordinary skill in the art. Further, the monitoring system 204 may be in communication with the VIDS 202 via a network (not shown). Still further, the monitoring system 204 may be in networked communication with multiple VIDS 202 providing intrusion detection capabilities to multiple systems at the same time. Of course, one of ordinary skill in the art would understand that the system 204 would have the same, or similar, hardware as that described above in FIGS. 1A and 1B.

The analysis system 204 includes capabilities including one or more of:

Offline profiling and modeling—training the system based on normal behavior of the applications and operating system.

Profiling control and configuration—initializing the virtualization layer to track selected events and to generate selected features.

Profile classification algorithms—a combination of machine learning and data mining algorithms that can be used, in conjunction with a model of normal behavior, to identify abnormal execution behavior of a system.

Intrusion detection—the use of a model of normal behavior, classification algorithms, and user-defined thresholds to identify intrusions.

False positive filtering—utilizing algorithms to reduce the number of false positives.

Intrusion remediation—identifying the actions necessary to thwart a detected intrusion may then be communicated to the virtualization layer.

System diagnostics—performing self-testing of the underlying system.

Management and reporting—the logging and reporting of the health or status of the system.

Operational View

From an operational standpoint, and as will be described in more detail below, embodiments of the present invention work in at least two stages: 1) an off-line (pre-deployment) stage; and 2) an on-line (post-deployment) stage.

In the off-line (pre-deployment) stage, the profiling system is configured to collect selected events and generate selected features. These features are then aggregated over time to generate profiles, which in turn are used by machine learning algorithms to create a model of normal system behavior. As such, embodiments of the present invention profile a system in a pre-deployment phase. Such profiling can occur, for example, while a system is being configured and benchmarked, i.e., prior to deployment. While one cannot assume that system behavior is constant across time, initial profiling is conducted at the pre-deployment stage and can continue thereafter during the online stage to adapt to changes in normal behavior over time. This adaptation involves the system switching between on-line monitoring and back to off-line modeling. This capability will allow the backend system to learn the behavior of any new applications that may be installed over time.

In the on-line (post-deployment) stage, the system is monitored by continually profiling the running system and using these profiles, in conjunction with machine learning algorithms and the pre-generated model of normal behavior, to detect anomalous behavior. The sensitivity of the machine learning detection algorithms can be altered by settable detection thresholds. Thresholds can be set by the user to trade-off, i.e., adjust the detection rate (true positives) and the false-alarm rate (false positives) to provide acceptable performance. In one embodiment, an interface on the back-end is provided through which these thresholds can be set and, in another embodiment, the on-line system adjusts these thresholds dynamically based on the range of feature values observed.

Architectural View

As above, from an architectural standpoint, the present invention consists of two sub-systems: (1) the "front end" profiling sub-system and (2) the "back end" modeling and monitoring sub-systems, as shown in Figure H as the Analysis System 204. In an embodiment of the present invention, these subsystems can be separate or combined.

Front End

The front end consists of a profiling sub-system that collects events, produces features, and generates system execution profiles.

Events

An event is the data and/or information extracted by the VIDS from the VMM during execution. It is understood that the information that can be extracted may differ from a VMM provided by one vendor as compared to a VMM provided by a different vendor. These differences may have an effect on the resulting comparisons.

Embodiments of the present invention, however, target those VMMs that are similar to one another (in terms of functionality, performance, target architecture, etc.) such as the VMware Workstation, VirtualBox, ESX Server, and Xen. The virtualization layer provides a mechanism by which the events can be obtained. The events—some events are related to the VMM and are common across different VMMs—the rest of the events are related to the characteristics of the underlying hardware (as presented in the VCPU, Vmem, Vdisk and virtualized network). The VMM and architectural events that the VMM intercepts are used as building blocks of features. With further analysis they become the behavior profile of the system. These events include, for example and not meant to be limiting, execution of privileged instructions, access to shared resources (memory), and I/O, e.g., disk, network, device, etc. Using a common set of events provides a robust VMM-based IDS since the system will not need to modified when moving to a different VMM. Of course, one of ordinary skill in the art will understand that the teachings of the present invention found herein can be applied to any VMM with minor modifications. In this work the open source edition of VirtualBox was used to construct the front-end.

Events are divided into three classes:

1) Virtual (VM) events—architectural-level and system events related to the virtualized guest OS executing inside the VM. For example, a guest modifying control registers, flushing the Translation Lookaside Buffer (TLB) or writing to the disk. These events may also include or correspond to particular applications running in the VM, e.g., a database application or the Guest OS. Thus, an application that is subsequently identified as suspicious, i.e., possibly malicious, can be isolated, terminated, etc.

2) VMM events—these events are extracted from the VMM and relate to the state of the VMM itself (as influenced by the state of the guest OS or the interaction between the guest OS and VMM). For example, the VirtualBox implementation has two internal modes: one to execute the guest OS directly on the CPU without intervention (user mode instructions) and another to intercept, instrument, or emulate system mode instructions.

3) Real events—these events can be extracted from within the VMM or from the host OS. The semantics of these events relate to the host OS. The real time clock is an example of such an event.

Features

A feature is derived from the events and is used to provide the information in an input format for processing by the back-end. The back-end (the machine learning algorithms) is given processed information that can be the result of filtering, aggregating, or transforming events. Features capture characteristics present in the event stream, so do not contain all the raw events contained in the original stream, but do quantify patterns that are effective in identifying normal and/or abnormal execution. Using features rather than events can help identify relevant execution patterns and behaviors.

There are multiple ways to construct features. Several feature dimensions can be used to extend the design space. These dimensions include the number of events used to construct the feature, the type of the event (virtual events, VMM events or real events) as well as the information used to measure time (virtual time, real time).

Rate Features

In embodiments of the present invention, rate features are constructed directly from the event stream in the following way, referring to FIG. 4. In one embodiment, rate features are constructed by counting the number of occurrences of events, or types of events, in each segment. For example, an event stream 402 is divided into consecutive segments 404 of equal (virtual) time, for example, SEGMENT_0, SEGMENT_1, SEGMENT_2, (in this example, a segment is constructed on each *TIMER event). Timer events are available in the VMM and can related to virtual time or physical time, i.e., wall-clock time.

Next, the events in a segment 404 are characterized to provide or produce feature-values for each segment 404. Thus, for example, during SEGMENT_0 there were two disk I/O operations and one network I/O operation. As shown, a first window WINDOW_0 406-1 is represented as a string <2 1 . . . >. Similarly, for a second window WINDOW_1 406-2, the events in the segment are represented as <1 0 . . . >. One of ordinary skill in the art will understand that the number of occurrences of events as represented in the windows 406 is not the same as those shown and these have been left out merely for the sake of clarity. It is understood that all or less than all of the events in a window would be accounted for (unless filtered out). Once all of the events in a window or segment have been accounted for, the feature-values are sent on for processing.

There are at least two advantages to using time-based windows. First, each window represents approximately the same amount of execution time and are therefore comparable to one another. Second, splitting the event stream into windows provides the ability to classify each window on its own, enabling on-line classification.

The length of the window (the virtual time captured in the window) introduces a trade-off, however, as longer windows capture more behavior while shorter ones reduce time to detection. Typically, a time interval is selected based on the class of applications present on the VM, since the intensity of the application and its interaction with the VMM will determine the number of events occurring per unit time. The time interval is set during off-line modeling. This allows each VM to have an associated time quantum in order to compute rate features. Alternatively, the user can be given the ability to set the time quantum. This time quantum provides the backend with sufficient information to make accurate classifications on a per window basis, and also allows the system to identify malicious activity within seconds from its execution.

Correlation Features

Correlation features are built with the intention of (augmenting) the information not covered by rate features. This may occur, for example, when different events have the same rate across windows. These windows can be differentiated from one another by, for example, accounting for the order that particular events took place, e.g., writes after reads, reads after writes, etc., where (deviation from an expected sequence may suggest and reveal the presence of an intrusion). For example, if during off-line modeling it was observed that in normal execution it is unlikely that the system would expect to see a high rate of disk writes in the same time quantum as a high rate of network reads, such an occurrence of events could indicate a detection of abnormal operation.

Profiles

A profile is an aggregation of features, representing a "snapshot" of system behavior in or over time. In one embodiment of the present invention, the profile consists of a set of windows and their associated features, as described above. Profiles are generated off-line (pre-deployment) in order to build an execution model of normal behavior and on-line (post-deployment) in order to identify anomalous behavior, in conjunction with an execution model and machine learning algorithms.

Back End

The back end consists of off-line modeling and on-line monitoring subsystems. Off-line modeling occurs pre-deployment, and in one embodiment of the present invention, consists of a feature analysis and selection phase followed by a model construction phase. On-line monitoring occurs post-deployment and consists of anomaly detection and remediation. Each of these aspects of the back end are discussed below.

Off-line Modeling

A model of the normal behavior of a given system is created off-line; such a model can be created, for example, while the system in question is being configured and "stress tested" pre-deployment. The model is captured in a vector containing the set of features being used by the backend system, and the feature values observed during off-line modeling.

Given the events, features, and profiles collected by the "front end" profiling sub-system, the back end "modeling" sub-system synthesizes a model of the normal behavior of the system. Synthesizing such a model involves analyzing the profiling information collected by the "front end" (some information is more "valuable" than others) followed by constructing a model from the most useful profiling information available.

Feature Analysis and Selection

In one embodiment of the present invention, the well-known Boosting Algorithm from Machine Learning is used to analyze the profiling information collected by the front end. A system executing a "normal" workload is injected with a diverse set of known malicious attacks. Events are collected by the front end and partitioned into contiguous blocks—"windows in time"—and within each window, features are constructed by aggregating the various events, e.g., by counting the various event types. Each window is represented by its set of features, and the aggregation of these windows (and associated features) constitutes a profile. Each window is labeled as "malicious" or "normal" depending on whether any attack was active during the window in question or not.

The Boosting Algorithm uses this labeled profile as training data to build an accurate classifier for discriminating between "malicious" and "normal" behavior. As known to those of ordinary skill in the art, thresholded features ("decision stumps") are used as "weak learners" within the Boosting Algorithm, and given the labeled profile as training data, the Boosting Algorithm produces a weighted linear combination of these decision stumps as its classifier. This weighted linear combination effectively gives more total weight to those features most useful in discriminating "malicious" from "normal" behavior and less total weight to those features least useful for such purposes. Boosting identifies features useful in modeling normal behavior, and not merely those features useful in identifying the given specific malicious behavior. As such, boosting can be used as an effective method to analyze features, determining those most useful for modeling normal behavior in a given system. Other feature analysis and selection algorithms can be employed as well.

Model Construction

Given an informative feature set obtained from feature analysis and selection, a model of normal behavior can be constructed. In one embodiment of the present invention, a variant of the well-known one-nearest-neighbor ("1NN") algorithm from Machine Learning is used. The profile information collected from a system executing a "normal" workload is collected, and the windows (and their associated features) are stored. Such a set of windows constitutes one model of normal behavior.

As known to those of ordinary skill in the art, the 1NN algorithm associates any new window with the most similar window in the 1NN model, where the similarity between two windows can be computed in any number of ways, as a function of the windows' respective feature sets. A new window which is similar to a known normal (model) window can be assumed normal, while a new window different from any known normal (model) window can be assumed anomalous. A similarity threshold can be used as a cutoff to delineate normal (i.e., similar) from anomalous (different), and this threshold can be tuned to trade-off false-positive and false negative errors. Such tuning can be accomplished through the use of a validation data set consisting, for example, of feature windows collected from known normal and malicious behaviors during pre-deployment model construction. The 1NN similarity values or thresholded predictions can also be filtered to enhance prediction accuracy, using state-of-the-art filtering techniques.

The on-line monitoring system keeps track of the classification of each window (normal vs. abnormal).

For example, an alarm could be raised based on one anomalous window, with respect to a predetermined threshold, being detected by the on-line monitoring system.

Alternately, an alarm could be raised if a predetermined number of consecutive windows, e.g., three, is detected as being abnormal.

Still further, the alarm could be raised when some amount of windows in a series of consecutive windows, i.e., a width of windows, are abnormal. For example, if the width is set to 10, and a window threshold is set to 60%, the alarm will be raised once any 6 out of the 10 windows are classified as abnormal. Note that this window threshold parameter may improve the detection rate (true positives) but might also increase false positives.

An alarm may be triggering using a confidence parameter that relaxes both width and window threshold parameters by allowing the raising of the alarm before the window threshold has been reached. This parameter accounts for the amount of the difference between the feature-value and its corresponding threshold. A level of confidence increases when the value is significantly higher than the corresponding threshold. This confidence parameter enables the system to decrease the time to detection by raising the alarm before the window threshold has been reached.

As such, an alarm is raised when the conditions specified in the filter are satisfied. Those familiar with the field of pattern classification will recognize that a large number of filters could be used to generate the alarm, and that the selection of the most appropriate alarm can be determined during off-line monitoring.

Other state-of-the-art unsupervised and semi-supervised machine learning and filtering algorithms can be employed as well for building an off-line model, as well as for providing for on-line monitoring.

On-line Monitoring

Given a model of the normal behavior of a given system constructed pre-deployment, the system in question can be monitored on-line, post-deployment. In one embodiment of the present invention, a 1NN model of normal behavior is constructed as described above, pre-deployment. Post-deployment, the running system is profiled by the front end, and this profile information (windows and associated features) is provided to the back end sub-system in order to detect anomalous behavior, as described above. The underlying model of normal behavior can also gradually evolve over time by returning to pre-deployment modeling mode to adapt to changing use patterns, using variants of these and other machine learning algorithms. Flagged anomalous behavior, together with information sufficient to decode and interpret the anomaly, e.g., the process number associated with the anomalous behavior, and the window features primarily responsible for incurring the low similarity, are provided for remediation to the VMM. The VMM can then take whatever action is appropriate based on the severity of the intrusion.

Further modifications to the embodiments of the present invention described herein include:

Changes to the Event format. In one embodiment, plain text is used to extract events and related information. It is envisioned that there is a 5-10% overhead charge associated with text (string) formatting. This overhead can be easily removed by using a binary format.

Filter unnecessary events. Rather than generating all events regardless of their usefulness to the analysis, filter them out preemptively. This is done at the VIDS and can be determined during off-line modeling.

On-the-fly trace consumption. In one embodiment, all information is stored in a trace on disk. While using traces may be simple and repeatable, it consumes large amounts of storage (GigaBytes) and can slow the physical host down. Alternatively, all information can be used/consumed directly.

Further, it is recognized that a high false positive rate can inhibit deployment in a production environment. This issue can be alleviated by improving the predictor, the quality of the features and the number of events extracted. Second, the IDS described herein can be deployed as one component of a system which can include multiple detectors (OS IDS as well as Application IDS). In such a case multiple sources will need to agree before raising an alarm.

VMM IDS suitability—As described above, one exemplary embodiment is directed to evaluating the IDS on regular environments such as software appliances. These environments, while limited, are common in data centers.

Evading the VMM IDS

A weakness shared by most types of IDSs, is one in which an attacker can study the defense methods and create new attacks evading the detectors. Although a VMM IDS may not be totally immune from attack, it is believed that it would be much harder to accomplish. An attacker would need to generate a low-level footprint such that it is either identical to the normal running workload or one that is very light and is, therefore, able to pass as being not abnormal. This task is both difficult to accomplish and is highly dependent on the target machine normal workload.

Timeliness—Timely detection is one of the main goals of any IDS. It is clear that a timely and early detection is advantageous. The presently described IDS is able to detect most malware within minutes of introduction. Although the detection is not always immediate, it is better to detect an attack after a few minutes than never. And while some damage can be done in the meantime, it is restricted to one VM.

Response—Generating a response to an attack is a followup to detecting the intrusion. While there may be no current industry framework for coordinating a response, it is envisioned that OS support can be used to interpret the low level data, identify the malware and generate a report useful for system administrators.

Additionally, several actions can be taken to resolve the attack. For example, a breached guest VM can be put offline while the attack is analyzed or an identified application can be quarantined, or the VM can be discarded and destroyed. Moreover, in many cases, appliances or a VM can be rolled back to a last known good configuration (a checkpoint). This action is relatively straightforward to implement in a VM environment.

Summary

A VMM-based IDS increases the ease of deployment across different operating systems and versions, and, as part of a VMM offers high manageability for computer-server appliances. A VMM-based IDS breaks the boundaries of current state-of-the-art IDSs and represents a new point in the IDS design space that trades a lack of program semantics for greater malware resistance and ease of deployment.

Embodiments of the above-described invention may be implemented in all software, all hardware, or a combination of hardware and software, including program code stored in a firmware format to support dedicated hardware. A software implementation of the above described embodiment(s) may comprise a series of computer instructions fixed on a tangible medium, such as a computer readable medium, e.g. diskette, CD-ROM, ROM, or fixed disk. The series of computer instructions embodies all or part of the functionality previously described herein with respect to the embodiment of the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

APPENDIX

VMM-based HIDS

Abstract

Current state-of-the-art host intrusion detection systems (HIDS) use program-level or operating system-level semantics to detect abnormal malicious behavior. These IDSs are tied to a specific binary format (for program-level IDSs), OS implementation or hardware architecture. These issues impact the ease of deployment of an IDS.

In this paper we propose a HIDS able to use only virtual machine monitor-level *semantics*. This ties a VMM-based IDS to a virtual machine monitor and hardware-architecture only, and can be easily deployed below different operating systems without modifications. Our work demonstrates that there is sufficient information available in the virtual machine monitor-level semantics to accurately identify security intrusions in compute-server appliances, while introducing minimal execution overhead.

1 Introduction

Zero day attacks and hidden malware pose a grave threat to computer users. To date, widespread security measures such as anti-virus packages and firewalls have proven to be ineffective in guarding against these types of malware. New security measures are essential to secure computer systems, protect digital information and restore user confidence.

Security mechanisms that are able to differentiate regular (normal) behavior from malicious (abnormal) behavior promise new ways to effectively detect, counter and ultimately prevent the execution of zero day attacks and hidden malware.

In this paper we present *VGuard*, a Host-based Intrusion Detection System (HIDS) that utilizes the VMM (virtual machine monitor) layer to extract VMM-level semantics during runtime. Extracting VMM-level information ties the IDS to a particular VMM and architecture. Such an IDS is much easier to deploy and manage as a part of a VMM. First, it does not depend on a particular operating system. In fact, VGuard can support different versions of both Windows and Linux without any modifications. Second, as part of a virtualization platform, security for multiple systems can be managed and controlled from a single centralized point - similar to the approach taken by VMWare in their VirtualCenter framework [42]. This reduces the cost and overhead associated with deploying HIDS across an organization.

A VMM-based IDS introduces a semantic gap between the program-level behavior of malware and the information that is extracted from the VMM. VGuard can overcome some of these limitations by employing advanced data mining techniques. Intuitively, we expect our workloads to be very regular in time and space, while intrusions introduce irregularities in the execution. In other words, the IDS can detect *changes* in the underlying behavior.

In this work we make a case for VMM-based HIDS. We extract (VMM-level) events and develop features that, when combined with sophisticated machine learning algorithms, allow us to accurately identify security intrusions in compute-server appliances. Specifically, we are able to correctly detect more than 99% of the malware with a false positive rate of less than 14%. We develop VGuard, a new design point in the IDS design space, and show that we can use VMM-level information to distinguish abnormal from normal behavior.

The rest of this paper is organized as follows. In section 2 we present a revised IDS Taxonomy and use it to classify the current state of the art in IDSs. In section 3 we describe VGuard's framework, the information we are able to extract from the VMM and how it is used to build features. In section 4 we evaluate our VMM-based IDS for its accuracy and performance. We discuss our work in section 5 and summarize in section 6.

2 Related work

Much work has been done in the area of host-based IDSs. We organize our discussion here according to the semantics utilized by (or information available to) the IDS:

1. Program-level IDS – An IDS that uses information available at the program/application abstraction level. This includes source code, static or dynamic information flow and application execution state.

2. OS-level IDS – An IDS that utilizes information available at the OS level such as system calls and system state.

3. VMM-level IDS – An IDS that uses semantics and information available at the VMM-level. This includes architectural information.

A related characterization of IDSs can be found in the work done by Gao et al. [8]. They use the terms white box, gray box, and black box to refer to the information available to the IDS. Black box systems only use system call information, white box systems include all information available including high (program-) level source or binary analysis, and gray box lies in between.

In our classification criteria, we consider a broader range of semantics available to the IDS. Program-level IDSs use information similar to that available in white or gray box systems. OS-level IDSs can use all system-level information available including (but not limited to) system calls (i.e., a black box system). VMM IDSs extend the characterization even further to include VMM-level information. We use this classification to contrast and compare current IDSs in the next sections, and to highlight the novelty of our own work: the first implementation of a VMM-level IDS.

2.1 Program-level IDS

Wagner et al. [43] show how static analysis can be used to thwart attacks that change the run time behavior of a program. They build a static model of the expected behavior (using system calls, call graph, etc.) and compare it to the runtime program behavior. In the work done by Kirda et al. [21], both static and dynamic analysis (including information leakage) is used to determine if behavior is malicious.

There have been a number information flow tracking systems that fall into this category. These systems include static [4, 26] and dynamic [41, 30, 28, 34, 2, 3] data flow analysis to extract program-level information available to the application only.

2.2 Operating system-level IDS

System calls have been used extensively to distinguish normal from abnormal behavior. One example is the work done by Kosoresow et al. [23]. In this work they use system call traces to find repeated system calls and common patterns, and store them in an efficient deterministic finite automaton. Then, during execution they compare and verify that all system call traces have been seen before.

Many other intrusion detection systems have used system call profiles to successfully detect malicious code [5, 10, 12, 22, 33, 44]. System call tracing can be done very efficiently and can provide much insight into program activities.

Stolfo et al. [37] use Windows registry accesses to detect anomalous behavior. The underlying idea is that while registry activity is regular in time and space, attacks tend to launch programs never launched before and change keys not modified since OS installation.

A disk-based IDS is presented in [11]. This IDS monitors data accesses, meta data accesses, and access patterns when looking for suspicious behavior. This disk-based IDS uses semantics available at the OS-level – it is able to read and interpret on-disk structures used by the file system.

2.3 VMM-level IDS

VMM-level IDSs use the semantics available at the VMM. We are not aware of any previous IDSs that fall under this category.

The most relevant intrusion detection systems which use VMMs, do so to isolate and secure the IDS. However, they rely on OS-level information and are therefore not *pure* VMM IDSs. For example, in the work done by Laureano et al. [24], a VM is used to isolate and secure the IDS outside the guest OS. The guest OS itself is a User Mode Linux [40] which is modified to extract OS data—system calls. Intel and Symantec present how a VMM can be used to isolate anti-virus software [14].

Garfinkel et al. present a Virtual Machine Introspection architecture [9] which is used to create a set of policies for intrusion detection. They use a special OS interface library (built on top of a Linux crash dump examination tool) to access information available at the OS level. Similarly, the VMwatcher system uses a VMM to export the guest OS raw disk and memory to a separate VM. A driver and symbols are used to compare memory views to detect rootkits and run an anti-virus software on the (exported) disk [18].

The work done by S. T. Jones et al. [19, 20] use only VMM-level semantics and information to develop a service specifically aimed at identifying and detecting hidden processes in virtual machines. So while they utilize information available in the VMM, the scope of their IDS is focused on hidden processes. Malware may create new process (not hidden) or attach itself to existing processes, thus eluding detection. In our work we develop a generic IDS able to detect a broader class of intrusions.

2.4 IDS comparison

In table 1 we present our view of the tradeoffs associated with the different IDS types according to the semantics available to them.

|                   | Program IDS | OS IDS | VMM IDS |
|-------------------|-------------|--------|---------|
| Malware semantics | High        | Medium | Low     |
| Performance       | Medium      | High   | High    |
| IDS resistance    | Low         | Medium | High    |
| IDS deployment    | Low         | Medium | High    |
| IDS suitability   | High        | High   | Medium  |

Table 1: IDS level comparison

We identify the following trends in IDS design:

- As more (program-level) semantics is available to the IDS, it is able to accurately identify and classify the malware. Using fewer semantics (as in the case of VMM-level IDS) can limit the effectiveness of an IDS and may restrict the guest environments that can be effectively secured.

- More semantics may also introduce a higher (performance) overhead, as extracting this information (if available) can introduces significant overhead. (For example, information flow tracking systems).

- Extracting program-level semantics may be done by modifying or monitoring the execution of the application. Frequently this is done in runtime in the application address space (using binary instrumentation techniques for example). While these techniques are able to protect the IDS from the application they monitor they are still vulnerable to malware running at a higher privilege level. For example, a root-kit may thwart both application-level and OS-level IDSs. In contrast, malware would first have to detect that an application or operating system is virtualized before a successful corruption could be launched against a VMM-level IDS.

- Lastly, program-level or OS-level IDSs are generally more customized to the underlying (application binary interface and OS). This hinders efforts to generalize IDSs and deploy them easily.

3 Framework

In this section we present VGuards framework. The framework consists of a front-end and a back-end (see figure 1). The front-end works together with a VMM to extract events. The events, which are collected dynamically, are used to construct features (this can be done online) and sent to the back-end. The back-end is responsible to detect abnormal behavior.

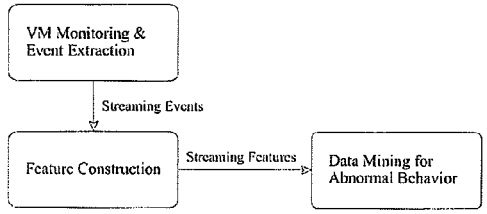

Figure 1: Our VMM IDS high-level design.

3.1 Events

We use the term *event(s)* to describe the data and information we extract from the VMM during execution. The information we can extract from different VMMs differs according to their implementation (and can affect the effectiveness and accuracy of our VMM-based IDS).

In our work we target similar VMMs (in terms of performance, target architecture, etc.) such as VMWare Workstation [42], VirtualBox [13], ESX Server [42], and Xen [29]. A subset of events can be found in all of them. These events are architectural events that the VMM must intercept to guarantee correct execution. These include, for example, execution of privileged instructions, access to shared resources (memory), and IO (disk, network, devices). We rely on this common set of events to create a robust VMM-based IDS.

We divide events into 3 classes:

1. Virtual (VM) events - architectural-level and system events related to the virtualized guest OS executing inside the VM.
   For example, a guest modifying control registers, flushing the TLB or writing to the disk.

2. VMM events - these events are extracted from the VMM and relate to the state of the VMM itself [1].
   For example, VirtualBox has two internal modes: one to execute the guest OS directly on the CPU without intervention (user mode instructions) and another to intercept, instrument, or emulate system mode instructions.

3. Real events - these events can be extracted from within the VMM or from the host OS. The semantics of these events is related to the host OS.
   The real time clock is an example of such an event.

3.2 Features

We use the term *feature(s)* to describe the information and input format provided to the back-end. The back-end (the machine learning algorithms) is given processed information that can be the result of filtering,

---

[1] Naturally, the VMM state is influenced by the state of the guest OS or the interaction between the guest OS and VMM.

aggregating, or transforming events. Features do not contain all the information extracted from the events but incorporate patterns that are effective in identifying normal and abnormal execution. Using features rather than events can help identify relevant execution patterns and behaviors.

There are multiple ways to construct features. In fact, the feature design space is very large. We have identified several feature *dimensions* that can be used to extend the design space. These dimensions include the number of events used to construct the feature, the type of the event (virtual events, VMM events or real events) as well as the information we use to measure time (virtual time, real time).

All of the features we use in this work are constructed directly from the event stream in the following way: first, we divide the event stream into consecutive segments of equal (virtual) time. Next, we apply each of our features on the events in the segment to produce feature-values for each feature. Finally, we send a *window* - containing all the feature-values in a segment - to our back-end.

The advantages of using time-based windows are two-fold. First, all windows represent approximately the same amount of execution time and are therefore comparable. Second, splitting the event stream into windows provides us with the ability to classify each window on its own, enabling on-line classification.

The length of the window (the virtual time captured in the window) introduces a tradeoff: longer windows capture more behavior while shorter ones reduce time to detection. We have found that windows of approximately 2 seconds long are a good operating point. This time quantum provides the backend with sufficient information to make accurate classifications on a per window basis, and also allows us to identify any malicious activity within seconds from its execution. In the next sections we describe the features we use in this work.

3.2.1 Rate Features

Rate features are simply constructed by counting the occurrences of events in each segment. In figure 2 we show how (feature-value) windows are constructed. First, on the left we show a list of events as they occur and how they are divided into segments (in this example, a segment is constructed on each timer event). Next, on the right we show (for each segment) rate feature-values - for both network IO and disk IO - contained in a window.

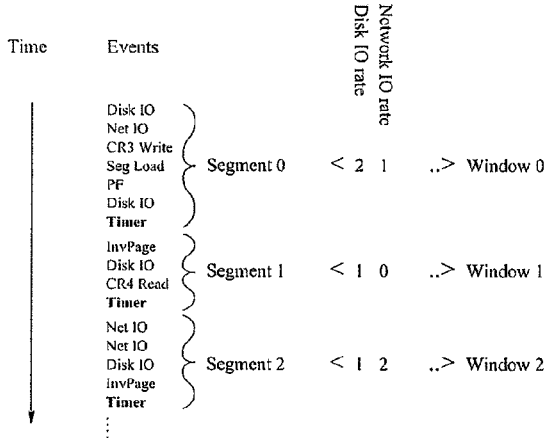

Figure 2: Constructing Features. Events (a) → Basic features (b)

We build multiple rate features such as page-fault count, control register modifications and more. These features can be efficiently constructed and provide rich information about the execution behavior of the system.

3.2.2 Relationship Features

Relationship features are built with the intention of capturing information not covered by rate features. This may happen for example, when different events have the same rate across windows. We are able to differentiate these windows by accounting for the order that particular events took place (e.g., writes after reads, reads after writes).

In Figure 3 we present an example: we show 2 pairs of segments. In each pair, the top and bottom segment contain a sequence of events A and B, with equal rates, and different event order. We have developed features able to detect the difference between the top and bottom segments in each pair.

For example, one of our features counts the number of event sequences of the same type. For our first pair this relationship feature produces two feature-values: 2 for the top segment and 16 for the bottom one. For our second pair the relationship feature produces 4 for the top segment and 5 for the bottom one.

1) A A A A A A A A B B B B B B B B
   A B A B A B A B A B A B A B A B

2) A B B A A A A A A B
   A A A B B A A B A A

Figure 3: Event order (information not captured by rate features)

Using this class of features, we can distinguish between the segments in each pair.

4 Evaluation

In this section we evaluate VGuard. First, we evaluate effectiveness. We use machine learning algorithms to show that there is sufficient information in a VMM-based IDS to differentiate normal from abnormal behavior accurately. Next, we evaluate our front-end and measure the event extraction overhead.

4.1 Effectiveness

In this section we provide evidence that an effective VMM IDS can be constructed. The section is organized in the following way. First we review our experimental setup. Next, we provide background on our machine learning techniques. We then show how we construct our classifier, how we train, and how we utilize it. We present the results from our classifier and show that it is able to detect abnormal behavior. Finally, we show how we can select the best features from the set available using our classifier.

4.1.1 Experimental setup

We have developed a set of benchmarks we use to evaluate the detection accuracy of our IDS. These benchmarks are designed to include a wide range of normal, regular behavior as well as a large set of abnormal malicious behavior.

The target deployment for our VMM-based IDS is to secure *Virtual Machine Appliances*. Each appliance usually is prepackaged with a commodity OS (Windows or Linux) and a software stack that is configured to perform a specific task(s) [27]. To this end we have setup different classes of servers, virtual appliances and workloads as shown in table 2. These systems are chosen to reflect a broad range of behaviors (CPU intensive workloads, disk accesses, network IO, etc.).

The TPC-C like workload is an on-line transaction processing benchmark [39]. It generates a random sequence of client accesses that generate a stream of somewhat random reads and writes. The ab workload is the Apache HTTP server benchmarking tool [1]. It is designed to measure performance in http requests per seconds. We use these servers and virtual appliances to generate normal behavior.

| Server | Virtual Appliance | Workload(s) |
|---|---|---|
| Database management system | MySQL Server + Window XP (SP3) | On-line transaction processing benchmark (TPC-C like) |
| Web Server | Apache HTTP Server + Windows XP (SP3) | 1. Requests per second (ab) |

Table 2: Normal workload (appliances)

Our abnormal workload consists of about 300 malicious executables. All the malicious behaviors we use in our intrusions are taken from *Malfease*, an online repository [17]. They include very recent (2008), real and mostly unknown (zero day) malware[2]. We use the following method to construct workloads that includes these malwares. We begin with executing one of our servers with the normal workload (this workload is executed continuously until shutdown). Next, at a predefined point in time, we execute the malware (in parallel to the normal workload). We then shutdown and discard the VM. This method is repeated for each of the malicious executables and for each normal workload[3].

4.1.2 Machine Learning background

In this section we review *boosting*, an algorithm we use to select features and build a predictor.

*boosting* is a Machine Learning algorithm which can combine many (possibly weak) classifiers to produces a highly accurate classifier. In our work we use the AdaBoost algorithm [31, 7]. This algorithm takes as input a set of classifiers and training data (labeled data), and produces a weighted linear combination of the input classifiers as its output classifier.

The basic idea behind boosting is simple. The algorithm works in iterations: in each iteration the algorithm evaluates all the input classifiers and chooses the one that produces the best classification results. This classifier, which minimizes the classification error the most, will become a part of the linear combination. Its weight (in the linear combination) will reflect our confidence in its quality. It then re-assigns weights to all the data points in such a way that assigns more weight to those points that are miss-classified. The new weight distribution of the data points directs the algorithm to choose a predictor capable of classifying the ones that were incorrectly classified so far. In other words, in each iteration the algorithm will choose a predictor that is *"specialized"* and is able to classify the most difficult data points - those that are miss-classified. The algorithm stops after executing a predefined number of iterations or when a certain error rate is reached.

The result of the algorithm is an accurate classifier - a weighted linear combination of the input classifiers. The weights assigned to the input classifiers reflect our confidence in their classification quality. We later use these weights to provide insight as to which ones of the input classifiers are used and how significant their contribution is.

4.1.3 Building the classifier and generating alarms

As explained above, our motivation is to verify that there is enough information available to distinguish normal from abnormal behavior. We build our classifier to do just that.

The inputs provided to the classifier are windows containing the feature-values created from the event stream as described in section 3.2. We use labeled, window-based, rate and relationship features. The windows are labeled normal if they do not contain any malicious activity or abnormal if they contain one or ---
[2]These malwares present some challenges. In particular, we do not know what these malware accomplish and cannot verify what the exact malicious behavior is.
[3]Overall we generate about 600 abnormal workloads.

more feature-values associated with malicious activity. We use the labels during training (of the predictor) as well as to measure accuracy (when testing).

During our training period we construct our classifier using boosting and use *Decision stumps* as our underlying predictors [6, 45]. Each Decision stump is a simple binary function that is using a threshold to classify a feature-value as abnormal or normal. For example, a decision stump can classify NetworkIO rate as normal if it is lower than 50 and abnormal otherwise. We create multiple decisions stumps with different thresholds, covering all possible classification options. We feed all the decision stumps and the labeled windows to our boosting algorithm. The result of boosting is our classifier.

Our classifier is now ready to classify unseen windows. However, the output of the classifier is a value and we need to decide whether this value is normal or abnormal. To this aim we construct a filter able to accepts a stream of classified windows and generates an alarm whenever abnormal behavior is found. In essence, when the alarm is raised we assert that malware has been found.

We can adjust the sensitivity of the filter using the following parameters:

Threshold. We apply a threshold to the value produced by boosting to decide if this window (feature-value) should be considered normal or abnormal.

Width. The alarm is raised only if a predefined number of *consecutive* windows (feature-values) are abnormal.

Majority vote. We can relax the width parameter by raising the alarm when a majority of windows are abnormal. For example, if the width is set to 10, and the majority vote is set to 60%, we will raise the alarm immediately once 6 out of 10 consecutive windows are classified as abnormal. Note that this parameter may improve the detection rate (true positives) but will also increase false positives.

Confidence. This parameter relaxes both width and majority vote parameters by allowing us to raise the alarm before a majority has been reached - when we are very confident. This parameter considers the difference between the classification value and the threshold itself. Our confidence increases when the value is *significantly* higher than the threshold. This parameter enables us to decrease the time to detection by raising the alarm before a majority has been reached.

Using our training data, we have tuned the parameters of the filter and found to most effective ones [4]. We choose a filter with the best tradeoff between true positives (detection rate), false positives and time to detection (timeliness).

4.1.4 Detection Rate

We are now ready to test against unseen malware. In all our experiments we use about 10% of the malware for training and 90% for testing.

In table 3 we show the best filter configurations for Apache and MySQL servers. Note, confidence is given as a percentage of threshold, thus for Apache, 80% of the threshold is 0.12 and a value above 0.27 will be considered confident.

| server | Accuracy | | Filter configuration | | | |
|---|---|---|---|---|---|---|
| | TP rate | FP rate | Threshold | width | majority vote | confidence |
| *Apache* | 1.0 | 0.131 | 0.15 | 3 | 50% | 80% |
| *MySQL* | 0.992 | 0.104 | 0.15 | 4 | 70% | 70% |

Table 3: Optimal filter configurations (Maximum time)

---
[4]The correctness of the alarm is computed in the following way: If the alarm is raised before the malware was executed - it is counted as a false positive. If the alarm is raised during or after the malware is executed - it is counted a true positive (we have found the malware). Finally, if the alarm was never raised - it is counted as a false negative.

IDSs should not only be evaluated based on their detection rate, on how fast they can reach a 100% detection rate, or their false alarm rates, but they should also be evaluated based on how early the intrusion is being detected.

Figure 4:
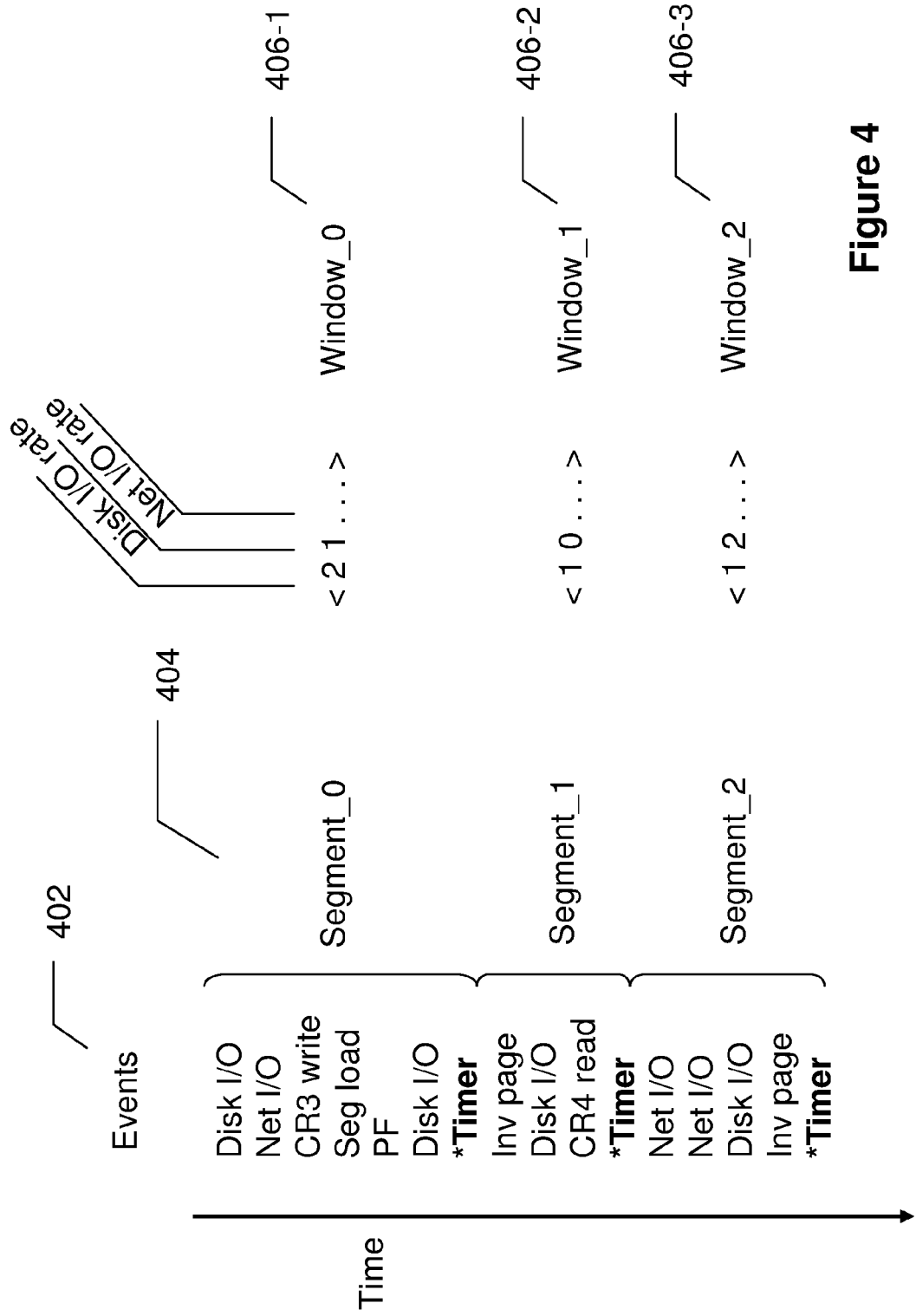
FIG. 4 is a representation of the collection of events and features in accordance with an embodiment of the present invention.

In figure 4 we show the true positive rate (detection rate) and the false positive rate as a function of timeliness for the two best configurations. Note that timeliness is measured in windows where each window corresponds to 2 approximately seconds.

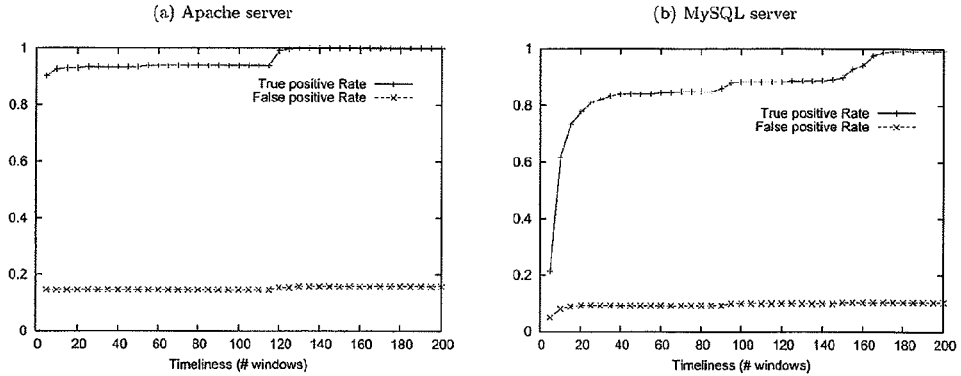

Figure 4: Optimal filters, Timeliness detection

4.1.5 Feature analysis and selection

Our goal within feature analysis and selection is to *select* (and possibly weight) those features most useful for distinguishing normal from abnormal events. Preferably those that can successfully generalize to unseen abnormal behavior.

As explained above, in each round of boosting we select the most accurate classifier with respect to the weighted training data in that round; in subsequent rounds, the misclassified data are accorded more weight, and (possibly) different classifiers are selected in order to help correctly label those misclassified training examples. Since the vast majority of our training data is *normal* (as is the case in most anomaly detection scenarios), we hypothesize that boosting will roughly tend to pick classifiers that help correctly label the normal (vast majority) data first, followed by those classifiers that help correctly classify the *specific* abnormal (vast minority) data in subsequent rounds. Thus, we expect that the classifiers (and associated features) selected in early rounds of boosting are most useful for characterizing normal behavior, while classifiers (and their associated features) selected in later rounds may be too highly tuned to correctly classifying specific abnormal behaviors and thus may not generalize to unseen abnormal behaviors.

We used the weights assigned by boosting to our features as a guide to which features are most useful and should be selected. To give some intuition as to the features we use in our classification methods we present table 1. In this table we show the top 5 features that were chosen for the MySQL and Apache servers.

Further analysis showed that VMM features contribute more than 5% for both apache workload and sql workload. One such feature that appears in both workload (3% for MySQL and 2% for Apache) is a relationship between the two execution modes of the VMM, namely recompile (in case of privileged instructions) and native modes (where the VMM executed the guest code without intervention).

We have analyzed the features chosen by boosting and made several observations:

- Relationship features have a greater impact when compared to rate features.

| Weight | Feature |
|---|---|
| MySQL server | |
| 18.2% | Relationship between page fault errors caused by non present page and page-level protection violation |
| 10.2% | Relationship between number of bytes read from disk and written to network |
| 8.6% | Relationship between TSS write and TLB flush events |
| 7.2% | Relationship between network read and network write events |
| 7.1% | Relationship between CR3 write and TLB flush events |
| Apache server | |
| 23.4% | Rate of page fault events that were caused by write |
| 8.9% | Relationship between CR3 write and page fault events |
| 6.9% + 5.3% | Relationship between page fault caused by read and page fault caused by write events. Note, these are two distinct relationship features. |
| 5.3% | Relationship between a move to privilege level 0 and disk IO events |

Table 4: Feature Contribution

Relationship feature do better since they contain some of the information also described by the rate features (some of the features may be redundant) and add information related to the underlying behavior of the system (event order).

- We show in later sections that both 'VMM_SYNC_GDT_ENTRY' and 'VIRTUAL_GDT_WRITE' events have a significant impact on the front-end performance (see figure 9).

However, the first event is not part of any of the features while the second is part of features that contribute less than 2.3% (MySQL) of the overall weight distributed to all our features.

It is worthwhile to remove these events and evaluate the impact on the detection rate. Filtering out unnecessary or low impact events can optimize our front-end.

Our investigation helps to support our claim that there is enough information embedded in the features to create an effective IDS, and also that our IDS can be trained using normal data only and can perform well.

4.1.6 Machine Learning background - Unsupervised

The previous machine learning technique we have used to build our intrusion detection systems (boosting) requires positive (malicious) training data. While such systems may accurately detect known malicious behavior, they may not adequately identify previously unseen attacks or only do so at high false alarm rates.

In this section we employ a *profiling* approach that does not require or make assumptions about malicious behavior, other than that it is "different" from normal behavior. Such a strategy requires training, but of a different kind. For example, in a production environment, new servers are often "stress tested" for many days or weeks with actual or realistic workloads before they are deployed. During such time, the behavior of the (virtualized) server can be profiled, and substantially different behavior encountered post-deployment can be flagged as potentially malicious.

In this section we use *One-class Anomaly Detection* to simulate exactly such a scenario. We test that monitoring a system at the VMM layer is sufficient to detect malicious behavior not previously seen or trained upon.

*One Nearest Neighbor(NN)* algorithm is a method for classifying objects based on closest training example in the feature space. Closeness is defined in terms of a distance metric. The NN algorithm consists of training and testing phases. In the training phase, the algorithm consists only of a data-profiling stage, where normal data points (windows) are collected along with their associated feature-values. In the testing phase, the test window (whose class is not known) is represented as a vector in the feature space. Distances from the new vector to all stored vectors are computed and the closest sample is selected. Since different features are usually measured with different metrics or at different scales, they must be normalized before applying the distance function. Min-max normalization is used for data transformation of continuous attribute values in the range [0, 1].

Choosing the right distance metric is a major problem for distance-based anomaly detection techniques, like (NN). Some applied distance metrics such as L2 distance (Eucleadian distance ) assumes the data have a Gaussian isotropic distribution. However the feature elements are often extracted for different statistical properties, and so their distributions may not be the same. Thus the assumption of isotropic distribution is often inappropriate, and different distance metrics may better reflect the underlying distribution.

Inspired by our feature selection results, we adopt the idea of using boosting with decision stumps to find the useful features, by training boosting with different distance metrics to select the most appropriate one. We implemented five distance metrics : L1 norm (Manhattan distance), L2 norm(Eucleadian distcance), Canberra metric, Chebychev distance, and Bray-Curtis distcance.

4.1.7 Building the classifier and generating alarms - Unsupervised

We applied the *Nearest Neighbor* method to the data sets described above as follows.

First, we choose to use a subset of the features, those selected to be the most useful as described above.

Second, we find the best distance metric for (NN). This is done by using boosting. The input to our boosting algorithm includes labeled, window-based, rate and relationship selected features as well as a set of input classifiers. Our input data includes only a subset of our data set. We call it our *Validatedataset* (it includes about 10% of our malware). Each one of the input classifiers is a NN predictor setup with a different distance metric and threshold (distance value). Note, while each of the underlying predictors is trained on normal data only the boosting algorithm uses both normal and abnormal data. Our results show that L1 norm (Manhattan distance) is ranked as the top underlying predictor.

Thus, we choose this predictor as our classifier. We don't care about the threshold - this comes from the filter.

Our (One NN - Manhattan distance) classifier is now ready to classify unseen windows. The output of the classifier is a value and we need to decide whether this value is normal or abnormal. To this aim we use the same filter as discussed above (Section Building the classifier and generating alarms)

The parameters of the filter are found in the same way we did above, using the validation set only. Results our shown in figure 5 where the tradeoff of detection rate, and false alarm rate is clearly shown.

Figure 6 shows the different filter configuration for the test set. Since this is the test set, We do not use this data set to configure our filter.

4.1.8 Detection Rate - Unsupervised

We are now ready to test against unseen malware.

In table 5 we show the best filter configurations for Apache and MySQL servers.

| server | Accuracy | | Filter configuration | | | |
|---|---|---|---|---|---|---|
| | TP rate | FP rate | Threshold | width | majority vote | confidence |
| Apache | 1.0 | 0 | 0.07 | 3 | 50% | 100% |
| MySQL | 1.0 | 0.273 | 0.04 | 2 | 60% | 70% |

Table 5: Optimal filter configurations (Maximum time)

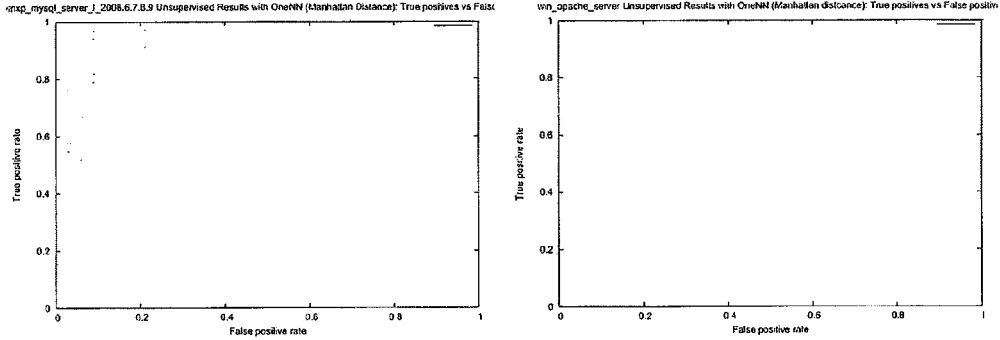

Figure 5: Configuring the filter parameters on top of a One NN (Manhattan Distance) using the validation data set. False positive rate vs attack detection rate. (Top) MySQL Server workload. (Bottom) Apache Server workload.

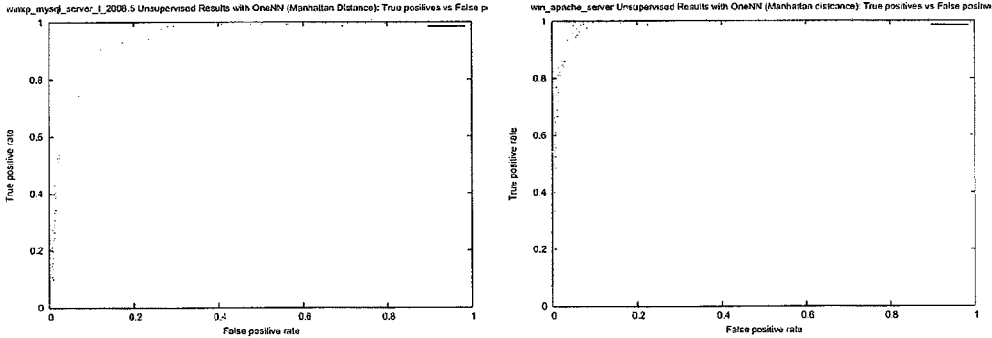

Figure 6: Filter parameters on top of a One NN (Manhattan Distance) using the test data set. False positive rate vs attack detection rate. (Top) MySQL Server workload. (Bottom) Apache Server workload.

4.2 Performance

One of the benefits of working at the VMM level is the low overhead introduced, but can we quantify this amount? In this section we present results quantifying the overhead of the VMM IDS event extraction. We first review our performance experimental setup, and present results. We then evaluate VMM IDS scalability and discuss future improvements.

4.2.1 Experimental setup

We have developed a set of benchmarks we use to evaluate the performance of our IDS. Measuring the performance of VMMs is not a simple task. VMWare has proposed a benchmark for measuring performance in virtual environments [25] which is based on common servers found data centers. A standard benchmark suite is currently being developed by SPEC [36].

In our work, to produce different classes of behavior we utilize the SpecINT2006 CPU benchmark suite [35], three common servers: MySQL, AsteriskNow, and Apache, as well as synthetic benchmarks targeting specific computing elements: IOzone [15], SysBench [38] and Iperf [16]. These benchmarks provide a good basis for performance evaluation since they represent a wide range of workloads.

The SpecINT2006 benchmarks are a set of compute intensive programs aimed at stressing the CPU, memory and compiler. Our servers, MySQL, AsteriskNow, and Apache are real applications we would expect to see in data centers. IOzone, SysBench and Iperf are specific benchmarks aimed at stressing one aspect of the system: IOzone is a filesystem benchmark tool which generates different file operations. SysBench is system performance benchmark of which we use the memory allocation and transfer speed test. Iperf is a tool to measure maximum network bandwidth.

We use two different configurations in our measurements (both configurations are optimizes:
(1) VMM,
(2) VMM + IDS modifications.

All the experiments are executed on our host, a Dell XPS710 equipped with an Intel Core2 processor (2 cores) running at 1.86 GHz, 4 GB of RAM and running WindowsXP (SP2). Our VMM is VirtualBox open source edition 1.6. All our guest VMs are running Linux distributions.

In all of our experiments we measure wall-clock time - the time observed by the user of the system. This can be easily done on a remote machine for our server benchmarks (MySQL, AsteriskNow, Apache and IPerf) or using online NIST (National Institute of Standards and Technology) Internet Time Service for the rest. Note that the particular execution time of each benchmark is of little importance as we are not interested in absolute performance but in the overhead associated with event extraction.

4.2.2 SpecINT2006, IOzone and SysBench

We have setup a virtual machine (VM) to test the SpecINT2006, IOzone and SysBench benchmarks. This VM is configured with one virtual CPU and one GB of RAM and is running Linux (Fedora 9).

All the benchmarks are executed consecutively. We begin with the IOzone automatic test which generates different file operations (reads, writes, etc.) for file sizes ranging from 64K to 512M. Next, we execute the SysBench memory test that reads and writes 1KB blocks to and from memory. Lastly, we execute 10 of the SpecINT2006 benchmarks compiled using the 'base' configuration [6].

We execute the same exact tests in both configurations (VMM and VMM+IDS) and measure execution time. Each test sequence was executed 3 times, on a separate VM run. Figure 7(a) shows the average execution time of each benchmark and our 95% confidence interval. Figure 7(b) shows the average performance overhead. We observe an overall average performance overhead of 6%, with a maximum of 11%.

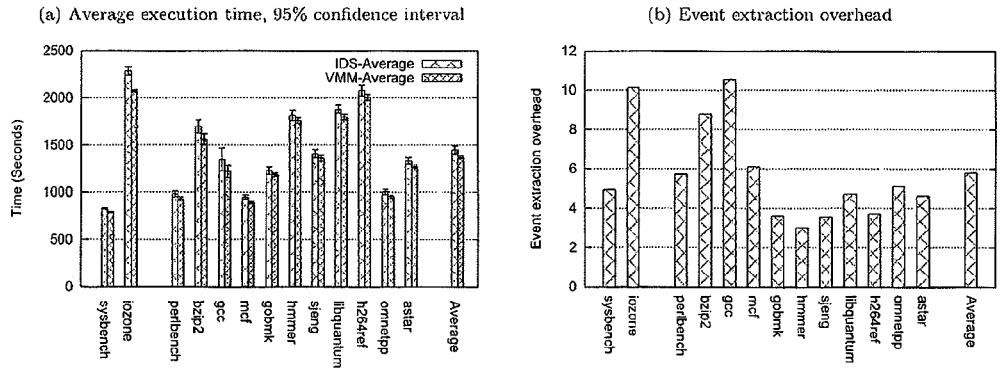

Figure 7: Performance measurements for IOzone, SysBench and SpecINT2006

---

[6]One benchmark (xalancbmk) did not compile while another (specrand) was too short (less than a minute).

4.2.3 Iperf and MySQL, AsteriskNow and Apache servers

We have setup different virtual machine for each of the servers. For MySQL, a VM is configured with one virtual CPU, one GB of RAM and is running Linux (Fedora 6). The AsteriskNow VM is configured with one CPU, 728 MB of RAM and is running rPathLinux. The Apache server VM has one CPU, one GB of RAM and is running SUSE 10.3. The IOzone test is executed on a VM with one virtual CPU, one GB of RAM and is running Linux (Fedora 9).

In our next set of results, we test our server workloads using TPC-C for MySQL (described above), ab for Apache (described above) and SIPp for AsteriskNow [7]. SIPp is a voice-over-IP appliance that is executing a basic SipStone [32] user agent client scenario (call, pause, hangup) to measure request capacity on the server [8]. The workload generators are executed on a separate computer that is connected through a private network to our host machine. This helps reduce variability introduced by network delays. These workload are capable of fully utilizing the host CPU allocated to the VM. In a separate test, we used Iperf to transmit 4 GB of data to our guest VM. We have executed each workload 8 times, 4 times in a row in two separate VM runs. Figures 8(a) and 8(b) show our server performance results.

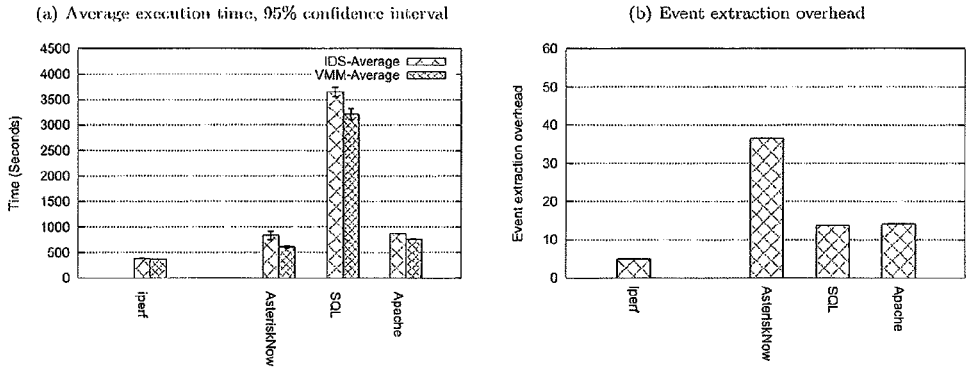

Figure 8: Performance measurements for Iperf and MySQL, AsteriskNow and Apache servers.

Our results show significant performance overhead for the AsteriskNow server. The difference in overhead is due to the underlying behavior of AsteriskNow (it generates many more events) as well as variability introduced by the host OS. In order to better understand the overhead associated with particular benchmarks and provide guidance for further optimizations we analyze the event distribution. Figure 9 shows the event distribution of our server workloads, two of the SpecCPU2006 benchmarks (many of the SpecINT2006 benchmarks behave similarly) as well as IOzone and SysBench [9].

The results shown provide several insights. First, we observe that the server event distribution is significantly different than that of the SpecINT2006 benchmarks. This may help explain why our servers exhibit larger overhead.

Secondly, we see that the percentage of 'VIRTUAL_GDT_WRITE' and 'VMM_SYNC_GDT_ENTRY' events is very high. Removing both these events can improve performance significantly as shown in figure 10.

---

[7] SIP - Session Initiation Protocol

[8] We have slightly modified some of our workload generators. The TPCC-like workload was modified to generate a similar sequence of MySQL queries to enable a fair comparison. However, these tests do contain some randomness: the queries themselves are random and the initial state of the server is not identical. We modified the SIPp benchmark to generate a predefined number of calls per second and to ignore those who fail (The default behavior of a failed call is to retry the call. However, this modifies the workload significantly and doesn't allow a fair comparison). All our tests (regardless of the configuration) show similar success rates of more than 98.6%.

[9] For our server workloads, the event distribution also contains startup and shutdown.

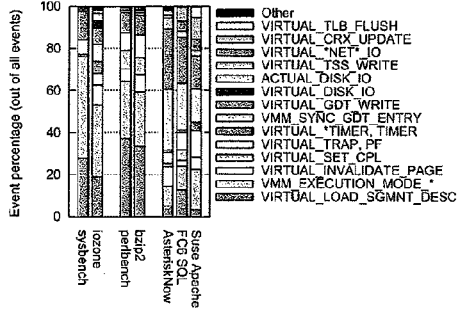

Figure 9: Event distribution for (IOzone, SysBench, perlbench, bzip2, Servers).

This optimization will prove useful only if these events do not contribute much information to the back-end – as shown in section 1.1.5.

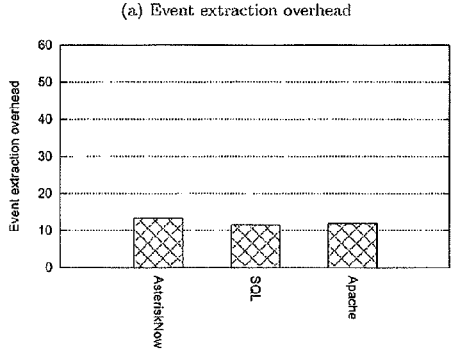

Figure 10: Performance measurement for MySQL, AsteriskNow and Apache servers -- without GDT events

4.2.4 Scalability

We have conducted additional experiments aimed at testing the scalability of our VMM-IDS. In these tests we paired each of our servers with the other two and executed the two server workloads simultaneously (in this case, we also extract events from both servers). We measured the execution time of each server using the same workload as described above. The servers did compete for CPU time since VirtualBox is able to utilize more than one CPU per VM (our host has two CPUs). They did not compete for memory.

Results show slowdown for both the original VMM as well as for our IDS. However, the relative overhead introduced by our IDS when executing the servers simultaneously is very similar to the overhead introduced when executing the servers separately. This provides initial evidence that VMM-IDS is as scalable as the underlying VMM.

4.2.5 Improvements

Our event extraction implementation can be improved and optimized in the following ways:

1. Event format. Our implementation uses plain text to extract events and related information (to aid with debugging).
   Initial tests show 5%-10% overhead associated with text (string) formatting. This overhead can be easily removed by using a binary format.
2. Filter unnecessary events. Our implementation generates all events regardless of their usefulness to the back-end.
3. On-the-fly trace consumption. Our implementation stores all information in a trace on disk. Using traces is simple and repeatable but requires large amounts of storage (GigaBytes) and can slow the physical host down. Our future implementation will consume all information directly.

5 Discussion

In this section we discuss several issues that came up during our work.

False positive - A High false positive rate can inhibit deployment in production environment. While our results show a low 14% false positive rate it may not be low enough for production environments. This issue can be alleviated in two ways. First, current and future work will aim at reducing the false positive rate even further. This can be done by improving the predictor, the quality of the features and the number of events extracted. Second, this IDS can be deployed as one component of a system which can include multiple detectors (OS IDS as well as Application IDS). In such a case multiple sources will need to agree before raising an alarm.

VMM IDS suitability - As described above, our intuition lead us to start evaluating our IDS on regular environments such as software appliances. These environments, while limited, are common in data centers.

Evading the VMM IDS

A weakness shared by most types of IDSs, is one in which an attacker can study the defense methods and create new attacks evading the detectors. Although a VMM IDS is not immune to this kind of attack, we believe it would be much harder to accomplish. An attacker would need to generate a low-level footprint such that it is either identical to the normal workload running or is very light. This task is both difficult to accomplish and is highly dependent on the target machine normal workload.

Timeliness - Timely detection is one of the main goals of this IDS. It is clear that a timely and early detection are preferable. Our IDS is able to detect most malware within minute of introductions. Although the detection is not always immediate, it is better to detect an attack after a few minutes than never. And while some damage can be done in the meantime, it is restricted to one VM.

Response - Generating a response to an attack is an issue, trivial as little semantics is available. This issue is not at all OS support can be used to interpret the low level data, identify the malware and generate a report useful for system administrators.

Additionally, several actions can be taken to resolve the attack. For example, a breached guest VM can be put offline while the attack is analyzed or it can be discarded and destroyed. Moreover, in many cases, appliances can role back to a last known good configuration (a checkpoint). This action is especially easy to accomplish in a VM environment.

6 Summary

A VMM-based IDS increases the ease of deployment across different operating systems and versions, and, as part of a VMM offers high manageability for compute-server appliances. VMM-based IDSs break the boundaries of current state-of-the-art IDSs. They represents a new point in the IDS design space that trades a lack of program semantics for greater malware resistance and ease of deployment.

In this work we evaluated a VMM-based IDS. We used the open source edition of VirtualBox to construct our front-end. We have shown what types of information we are able to extract from the VMM and described the procedure we use to build features. We evaluated the performance overhead for multiple benchmarks and showed it is low, averaging approximately 6% for spec2006INT and 12% for our compute servers. We presented several ways to further reduce the overhead. We used boosting, a machine learning algorithm, to show that enough information is extracted from the VMM to accurately detect 99% of the abnormal behavior in compute-server appliances and can do so in a timely fashion.

VGuard offers a wealth of future research opportunities. Our front-end can be extended to other VMMs such as Xen or ESX server and its performance can be significantly improved. Additional events can be extracted and used to build new features. Our back-end provides a whole new research dimension. Many machine learning algorithms can be evaluated for effectiveness as well as performance.

References

[1] The Apache Software Foundation. ab - Apache HTTP server benchmarking tool. http://www.apache.org/.

[2] Y. Beres and C. I. Dalton. Dynamic label binding at run-time. In *NSPW '03: Proceedings of the 2003 workshop on New security paradigms*, pages 39–46, New York, NY, USA, 2003. ACM Press.

[3] W. Cheng, Q. Zhao, B. Yu, and S. Hiroshige. TaintTrace: Efficient Flow Tracing with Dynamic Binary Rewriting. In *Proc. 11th IEEE International Symposium on Computers and Communications*. IEEE, Jun. 2006.

[4] D. E. Denning. A lattice model of secure information flow. *Commun. ACM*, 19(5):236–243, 1976.

[5] G. Edjlali, A. Acharya, and V. Chaudhary. History-based access control for mobile code. In *CCS '98: Proceedings of the 5th ACM conference on Computer and communications security*, pages 38–48, 1998.

[6] Y. Freund and R. E. Schapire. Experiments with a new boosting algorithm. In *Proceedings of the Thirteenth International Conference on Machine Learning*, pages 148–156. Morgan Kaufmann, 1996.

[7] Y. Freund and R. E. Schapire. A decision-theoretic generalization of on-line learning and an application to boosting. *Journal of Computer and System Sciences*, 55(1):119–139, August 1997.

[8] D. Gao, M. K. Reiter, and D. Song. On gray-box program tracking for anomaly detection. In *Proceedings of the 13th USENIX Security Symposium*, pages 103–118, San Diego, CA, USA, Aug. 9-13 2004.

[9] T. Garfinkel and M. Rosenblum. A virtual machine introspection based architecture for intrusion detection. In *Proc. Network and Distributed Systems Security Symposium*, February 2003.

[10] I. Goldberg, D. Wagner, R. Thomas, and E. A. Brewer. A secure environment for untrusted helper applications (confining the wily hacker). In *Proceedings of the 6th Usenix Security Symposium*, San Jose, CA, USA, 1996.

[11] J. L. Griffin, A. G. Pennington, J. S. Bucy, D. Choundappan, N. Muralidharan, and G. R. Ganger. On the feasibility of intrusion detection inside workstation disks. Technical Report CMU-PDL-03-106, Carnegie Mellon University, 2003.

[12] S. A. Hofmeyr, S. Forrest, and A. Somayaji. Intrusion detection using sequences of system calls. *Journal of Computer Security*, 6(3):151–180, 1998.

[13] Innotek. Innotek virtualbox. http://www.virtualbox.org/.

[14] Intel and Symantec. Symantec Virtual Security Solution and PCs with Intel vPro Technology, 2006. http://www.intel.com/business/casestudies/symantec_solutions_brief.pdf.

[15] IOzone. IOzone filesystem benchmark. http://www.iozone.org/.

[16] Iperf. Iperf - maximum tcp and udp bandwidth benchmark. http://sourceforge.net/projects/iperf/.

[17] ISC OARC. Project Malfease. https://malfease.oarci.net/.

[18] X. Jiang, X. Wang, and D. Xu. Stealthy malware detection through vmm-based "out-of-the-box" semantic view reconstruction. In *CCS '07: Proceedings of the 14th ACM conference on Computer and communications security*, pages 128–138, New York, NY, USA, 2007.

[19] S. T. Jones, A. C. Arpaci-Dusseau, and R. H. Arpaci-Dusseau. Antfarm: tracking processes in a virtual machine environment. In *ATEC '06: Proceedings of the annual conference on USENIX '06 Annual Technical Conference*, Berkeley, CA, USA, 2006. USENIX Association.

[20] S. T. Jones, A. C. Arpaci-Dusseau, and R. H. Arpaci-Dusseau. Vmm-based hidden process detection and identification using lycosid. In *VEE '08: Proceedings of the fourth ACM SIGPLAN/SIGOPS international conference on Virtual execution environments*, pages 91–100, New York, NY, USA, 2008. ACM.

[21] E. Kirda, C. Kruegel, G. Banks, G. Vigna, and R. Kemmerer. Behavior-based Spyware Detection. In *Proceedings of the 15th USENIX Security Symposium*, Vancouver, BC, Canada, Aug. 2006.

[22] C. Ko, T. Fraser, L. Badger, and D. Kilpatrick. Detecting and countering system intrusions using software wrappers. In *Proceedings of the USENIX Security Conference*, pages 145–156, Jan. 2000.

[23] A. P. Kosoresow and S. A. Hofmeyr. Intrusion detection via system call traces. *IEEE Softw.*, 14(5):35–42, 1997.

[24] M. Laureano, C. Maziero, and E. Jamhour. Intrusion detection in virtual machine environments. In *Proceedings of the 30th EUROMICRO Conference (EUROMICRO'04)*, pages 520–525, Washington, DC, USA, 2004.

[25] V. Makhija, B. Herndon, P. Smith, L. Roderick, E. Zamost, and J. Anderson. VMmark: A scalable benchmark for virtualized systems. Technical Report TR-2006-002, VMware Inc., Sep. 2006.

[26] A. C. Myers. Jflow: practical mostly-static information flow control. In *POPL '99: Proceedings of the 26th ACM SIGPLAN-SIGACT symposium on Principles of programming languages*, pages 228–241, New York, NY, USA, 1999. ACM Press.

[27] NEI. Network Engines. http://www.nei.com/.

[28] J. Newsome and D. Song. Dynamic taint analysis for automatic detection, analysis, and signature generation of exploits on commodity software. In *The 12th Annual Network and Distributed System Security Symposium*, Feb. 3-4, San Diego, CA, USA, 2005.

[29] P. Barham, B. Dragovic, K. Fraser, S. Hand, T. Harris, A. Ho, R. Neugebauer, I. Pratt, and A. Warfield. Xen and the art of virtualization. In *SOSP '03: Proceedings of the nineteenth ACM symposium on Operating systems principles*, pages 164–177, 2003.

[30] Perldoc. Perl 5.8.7 documentation, perlsec - perl security. http://perldoc.perl.org/perlsec.html.

[31] R. E. Schapire. The boosting approach to machine learning: An overview. In *Nonlinear Estimation and Classification*. Springer, 2003.

[32] H. Schulzrinne, S. Narayanan, J. Lennox, and M. Doyle. Sipstone - benchmarking sip server. http://www.sipstone.org/, April 2002.

[33] K. Scott and J. Davidson. Safe virtual execution using software dynamic translation. In *ACSAC '02: Proceedings of the 18th Annual Computer Security Applications Conference*, page 209, Washington, DC, USA, 2002. IEEE Computer Society.

[34] J. Seward and N. Nethercote. Using valgrind to detect undefined value errors with bit-precision. In *USENIX 2005 Annual Technical Conference*, pages 17–30, Apr. 10-15, Anaheim, CA, USA, 2005.

[35] Standard Performance Evaluation Corporation SPEC. SpecCPU2006. http://www.spec.org/cpu2006/.

[36] Standard Performance Evaluation Corporation SPEC. SpecVirtualization. http://www.spec.org/specvirtualization/.

[37] S. J. Stolfo, F. Apap, E. Eskin, K. Heller, S. Hershkop, A. Honig, and K. Svore. A comparative evaluation of two algorithms for windows registry anomaly detection. *J. Comput. Secur.*, 13(4):659–693, 2005.

[38] SysBench. Sysbench: a system performance benchmark. http://sysbench.sourceforge.net/.

[39] Transaction Processing Performance Council (TPC). TPC-C, an on-line transaction processing benchmark. http://www.tpc.org/.

[40] UML. User-mode linux kernel. http://user-mode-linux.sourceforge.net/.

[41] N. Vachharajani, M. J. Bridges, J. Chang, R. Rangan, G. Ottoni, J. A. Blome, G. A. Reis, M. Vachharajani, and D. I. August. Rifle: An architectural framework for user-centric information-flow security. In *MICRO 37: Proceedings of the 37th annual International Symposium on Microarchitecture*, pages 243–254, Washington, DC, USA, 2004. IEEE Computer Society.

[42] VMware. VMware. http://www.vmware.com/.

[43] D. Wagner and D. Dean. Intrusion detection via static analysis. In *SP '01: Proceedings of the 2001 IEEE Symposium on Security and Privacy*, page 156, Washington, DC, USA, 2001. IEEE Computer Society.

[44] C. Warrender, S. Forrest, and B. A. Pearlmutter. Detecting intrusions using system calls: Alternative data models. In *IEEE Symposium on Security and Privacy*, pages 133–145, 1999.

[45] I. H. Witten and E. Frank. *Data Mining: Practical Machine Learning Tools and Techniques*. Elsevier, second edition, 2005.

What is claimed is:

1. A computer-implemented method for determining a status of a virtual machine (VM) running in conjunction with a virtual machine monitor (VMM), wherein one or more applications and a guest operating system (OS) are running in the VM, the method comprising:
    collecting a stream of events from the VMM, using at least one computer processor, each event in the stream corresponding to an operation of the VMM; and
    determining the status of the VM as a function of the collected stream of events.

2. The method of claim 1, wherein determining the status of the VM comprises: comparing the stream of events to one or more predetermined parameters.

3. The method of claim 1, wherein determining the status of the VM comprises: grouping the stream of events into at least one window of events, wherein the at least one window is of a predetermined window length.

4. The method of claim 3, wherein the predetermined window length is of a predetermined duration of time.

5. The method of claim 3, wherein the at least one window comprises at least one event.

6. The method of claim 3, wherein determining the status of the VM further comprises:
    determining at least one feature-value for each at least one window, wherein each at least one feature-value represents a number of events of a predetermined event type found in a respective window.

7. The method of claim 6, wherein determining the status of the VM further comprises: comparing the determined at least one feature-values for each at least one window to a predetermined set of one or more threshold values.

8. The method of claim 1, wherein each event is at an architectural level representing a machine state of the VMM.

9. The method of claim 8, wherein the event is chosen from the group consisting of:
    virtual events related to the guest OS running in the VM;
    VMM events related to a state of the VMM; and runtime metrics.

10. The method of claim 1, wherein each event has a corresponding event-type, and wherein determining the status of the VM further comprises:
    removing, from the collected stream of events, one or more events corresponding to one or more predetermined event-types; and
    determining the state of the VMM as a function of the non-removed events.

11. A system for detecting an unauthorized application executing in a virtual machine (VM) running a guest operating system (OS) in a virtualization system comprising virtualization logic, the virtualization logic comprising a virtual machine monitor (VMM), the system comprising:
    the virtualization logic configured to collect a stream of events from the VMM, each event in the stream corresponding to an operation of the VMM;
    the virtualization logic configured to provide the stream of events to intrusion detection logic; and;
    the intrusion detection logic configured to determine whether or not an unauthorized application is executing in the virtualization system as a function of the collected stream of events.

12. The system of claim 11, further comprising:
    the intrusion detection logic configured to:
        group the stream of events into one or more windows, each window comprising one or more events; and
        determine whether a respective window is one of normal or abnormal.

13. The system of claim 12, further comprising:
    the intrusion detection logic configured to:
        establish, for each window, at least one feature-value representing a number of events of a predetermined event type in the respective window; and
        compare each at least one feature-value to a respective threshold value.

14. The system of claim 12, further comprising:
    the intrusion detection logic configured to:
    determine that an unauthorized application is executing in the VM if at least one of:
        a predetermined number of consecutive windows are determined to be abnormal; and
        a predetermined percentage of consecutive windows are determined to be abnormal.

15. The system of claim 14, further comprising:
    the intrusion detection logic configured to:
        determine that a window is abnormal if at least one feature-value in the window exceeds its respective threshold value by a predetermined margin.

16. The system of claim 11, wherein each event has a corresponding event-type, the system further comprising:
    the intrusion detection logic configured to:
        remove, from the collected stream of events, one or more events corresponding to one or more predetermined event-types; and
        determine the state of the VMM as a function of the non-removed events.

17. The system of claim 11, wherein each event is at an architectural level representing a machine state of the VMM.

18. The system of claim 17, wherein the event is chosen from the group consisting of:
    virtual events related to the guest OS running in the VM;
    VMM events related to a state of the VMM; and runtime metrics.

19. A non-transitory computer program product, tangibly embodied in a computer-readable medium, the computer program product for detecting an unauthorized application executing in a virtual machine (VM) running in conjunction with a virtual machine monitor (VMM), wherein one or more applications and a guest operating system (OS) are running in the VM, the computer program product including instructions operable to cause a data processing apparatus to:
    receive a stream of events from the VMM, each event in the stream corresponding to an operation of the VMM; and
    determine that an unauthorized application is executing in the VM as a function of the received stream of events.

20. The computer program product of claim 19, wherein the instructions operable to cause the data processing apparatus to determine that an unauthorized application is executing in the VM comprise instructions operable to cause the data processing apparatus to:
    compare the stream of events to one or more predetermined parameters.

21. The computer program product of claim 19, wherein the instructions operable to cause the data processing apparatus to determine that an unauthorized application is executing in the VM comprise instructions operable to cause the data processing apparatus to:
    group the stream of events into a plurality of windows of events, wherein each window is of a predetermined window length.

22. The computer program product of claim 21, wherein the predetermined window length is of a predetermined duration of time.

23. The computer program product of claim 22, wherein each window comprises at least one event.

24. The computer program product of claim 21, wherein the instructions operable to cause the data processing apparatus to determine that an unauthorized application is executing in the VM further comprise instructions operable to cause the data processing apparatus to:

determine at least one feature-value for each window, wherein each at least one feature-value represents a number of events of a predetermined event type found in a respective window.

25. The computer program product of claim 24, wherein the instructions operable to cause the data processing apparatus to determine that an unauthorized application is executing in the VM further comprise instructions operable to cause the data processing apparatus to:

compare the determined at least one feature-values for each window to a predetermined set of threshold values.

26. The computer program product of claim 21, further comprising instructions operable to cause the data processing apparatus to:

determine that an unauthorized application is executing in the VM if at least one of:
  a predetermined number of consecutive windows are determined to be abnormal; and
  a predetermined percentage of consecutive windows are determined to be abnormal.

27. The computer program product of claim 26, wherein the instructions operable to cause the data processing apparatus to determine whether or not a window is abnormal comprise instructions operable to cause the data processing apparatus to:

compare each at least one feature-value for a respective window to a corresponding threshold value.

28. The computer program product of claim 27, further comprising instructions operable to cause the data processing apparatus to:

determine that a window is abnormal if at least one feature-value in the window exceeds its corresponding threshold value by a predetermined margin.

29. The computer program product of claim 19, wherein each event is at an architectural level representing a machine state of the VMM.

30. The computer program product of claim 29, wherein the event is chosen from the group consisting of:
  virtual events related to the guest OS running in the VM; VMM events related to a state of the VMM; and runtime metrics.

31. The computer program product of claim 19, wherein each event has a corresponding event-type, the computer program product further comprising instructions operable to cause the data processing apparatus to:

remove, from the collected stream of events, one or more events corresponding to one or more predetermined event-types; and determine that an unauthorized application is executing in the VMM as a function of the non-removed events.

* * * * *